US009978400B2

(12) United States Patent
Guan et al.

(10) Patent No.: US 9,978,400 B2
(45) Date of Patent: May 22, 2018

(54) METHOD AND APPARATUS FOR FRAME LOSS CONCEALMENT IN TRANSFORM DOMAIN

(71) Applicant: ZTE CORPORATION, Shenzhen, Guangdong Province (CN)

(72) Inventors: Xu Guan, Shenzhen (CN); Hao Yuan, Shenzhen (CN); Mofei Liu, Shenzhen (CN); Ke Peng, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 104 days.

(21) Appl. No.: 14/736,499

(22) Filed: Jun. 11, 2015

(65) Prior Publication Data

US 2016/0365097 A1 Dec. 15, 2016

(51) Int. Cl.
*G06F 17/20* (2006.01)
*G10L 21/00* (2013.01)
(Continued)

(52) U.S. Cl.
CPC ............ *G10L 25/90* (2013.01); *G10L 19/005* (2013.01); *G10L 2025/906* (2013.01)

(58) Field of Classification Search
CPC ..... G10L 19/02; G10L 19/0212; G10L 25/27; G10L 25/90; G10L 19/09; G10L 19/08; G10L 19/005
(Continued)

(56) References Cited

U.S. PATENT DOCUMENTS 9,330,672 B2 * 5/2016 Guan ...................... G10L 19/02
2004/0083110 A1 * 4/2004 Wang .................... G10L 19/005
704/500
(Continued)

FOREIGN PATENT DOCUMENTS

CN 103065636 A 4/2013
CN 103854649 A 6/2014
(Continued)

OTHER PUBLICATIONS

3rd Generation Partnership Project; Technical Specification Group Services and System Aspects; Codec for Enhanced Voice Services (EVS); Error Concealment of Lost Packets (Release 12). 3GPP TS 26.447 V1.0.0 (Sep. 2014).
(Continued)

*Primary Examiner* — Akwasi M Sarpong
(74) *Attorney, Agent, or Firm* — Ling Wu; Stephen Yang; Ling and Yang Intellectual Property

(57) ABSTRACT

The present document discloses a method and apparatus for compensating for a lost frame in a transform domain, comprising: calculating frequency-domain coefficients of a current lost frame using frequency-domain coefficients of one or more frames prior to the current lost frame, and performing frequency-time transform to obtain an initially compensated signal; and performing waveform adjustment, to obtain a compensated signal. Alternatively, extrapolation is performed for all or part of frequency points of the current lost frame using phases and amplitudes of corresponding frequency points of a plurality of previous frames to obtain phases and amplitudes of the corresponding frequency points of the current lost frame, to obtain frequency-domain coefficients of the corresponding frequency points, and frequency-time transform is performed to obtain a compensated signal. The above methods can be selected through a
(Continued)

judgment algorithm to compensate for the current lost frame, thereby achieving a better compensation effect.

16 Claims, 6 Drawing Sheets

(51) Int. Cl.
*G10L 15/00* (2013.01)
*G10L 15/16* (2006.01)
*G10L 25/90* (2013.01)
*G10L 19/005* (2013.01)

(58) Field of Classification Search
USPC ....... 704/214, 203, 207, 500, 219, 206, 229; 370/352, 252
See application file for complete search history.

(56) References Cited

U.S. PATENT DOCUMENTS

2007/0091873 A1* 4/2007 LeBlanc .................. H04B 3/23 370/352
2008/0033718 A1* 2/2008 Zopf ..................... G10L 19/005 704/229
2009/0076805 A1* 3/2009 Xu ........................ G10L 19/005 704/206
2009/0306994 A1* 12/2009 Chon .................... G10L 19/167 704/500
2009/0316598 A1* 12/2009 Zhan ..................... G10L 19/005 370/252
2010/0286805 A1* 11/2010 Gao .................... G10L 19/0017 700/94
2011/0301960 A1* 12/2011 Suzuki .................. G10L 19/005 704/500
2012/0109659 A1* 5/2012 Wu ..................... G10L 19/0212 704/500
2013/0262122 A1* 10/2013 Kim ........................ G10L 19/02 704/268
2014/0052439 A1* 2/2014 Rose ....................... G10L 19/09 704/219
2014/0249806 A1* 9/2014 Liu ..................... H03M 7/3082 704/206
2014/0337039 A1* 11/2014 Guan ...................... G10L 19/02 704/500

FOREIGN PATENT DOCUMENTS

EP 2772910 A1 9/2014
WO 2013060223 A1 5/2013

OTHER PUBLICATIONS

3GPP, Technical Specification Group Services and system Aspects, Codec for Enhanced Voice Services, EVS Codec Error Concealment of Lost Packets, Release 12, 3GPP TS 26.447, V0.0.1, May 2014, Valbonne, France.

* cited by examiner

METHOD AND APPARATUS FOR FRAME LOSS CONCEALMENT IN TRANSFORM DOMAIN

TECHNICAL FIELD

The present document relates to the field of audio codec, and in particular, to a method and apparatus for compensating for a lost frame in a transform domain.

BACKGROUND OF THE RELATED ART

In the network communications, the packet technology is very widely applied, and various forms of information for example data such as speech or audio etc. are encoded and then transmitted on the network using the packet technology, such as Voice over Internet Protocol (VoIP) etc. As the transmission capacity at the information transmitting terminal is limited or the frames of the packet information have not arrived at the buffer of the receiving terminal within a specified delay time, or the frame information is lost due to network congestion and jams etc., the synthetic tone quality at the decoding terminal decreases rapidly. Therefore, it needs to compensate for data of the lost frame using a compensation technology. The technology of compensating for a lost frame is a technology of mitigating reduction in tone quality resulting from the lost frame.

The related method for frame loss concealment of an audio in a transform domain is a method of repeatedly using a signal in a transform domain of the previous frame or using muting for substitution. Although the method is simple to implement and has no delay, the compensation effect is modest. Other compensation manners such as Gap Data Amplitude and Phase Estimation Technique (GAPES) need to convert the MDCT coefficients into Discrete Short Time Fourier Transform (DSTFT) coefficients and then perform compensation. The method has a high computational complexity, and consumes a lot of memories. Another method is to use a shaped noise insertion technology to compensate for the lost frame of the audio, the method has a good compensation effect for the noise-like signals, but has a bad compensation effect for the harmonic audio signals.

In conclusion, related technologies for compensating for a lost frame in a transform domain mostly do not have obvious effects, have high computational complexity and long delay, or have bad compensation effects for some signals.

SUMMARY OF THE INVENTION

The technical problem to be solved by the present document is to provide a method and apparatus for compensating for a lost frame in a transform domain, which can achieve a better compensation effect with a low computational complexity and without delay.

In order to solve the above technical problem, the present document provides a method for frame loss concealment in a transform domain, comprising:

calculating frequency-domain coefficients of a current lost frame using frequency-domain coefficients of one or more frames prior to the current lost frame, and performing frequency-time transform on the calculated frequency-domain coefficients of the current lost frame to obtain an initially compensated signal of the current lost frame; and performing waveform adjustment on the initially compensated signal, to obtain a compensated signal of the current lost frame.

Further, performing waveform adjustment on the initially compensated signal, to obtain a compensated signal of the current lost frame comprises:

estimating a pitch period of the current lost frame and judging whether the estimated pitch period value is usable, and if the pitch period value is unusable, taking the initially compensated signal of the current lost frame as the compensated signal of the current lost frame; and if the pitch period value is usable, performing waveform adjustment on the initially compensated signal with a time-domain signal of the frame prior to the current lost frame.

Further, estimating a pitch period of the current lost frame comprises:

performing pitch search on a time-domain signal of a last correctly received frame prior to the current lost frame, to obtain a pitch period value and a maximum of normalized autocorrelation of the last correctly received frame prior to the current lost frame, and using the obtained pitch period value as a pitch period value of the current lost frame.

Further, the method further comprises:

before performing pitch search on the time-domain signal of the last correctly received frame prior to the current lost frame, performing low pass filtering or down-sampling processing on the time-domain signal of the last correctly received frame prior to the current lost frame, and performing pitch search on the time-domain signal of the last correctly received frame prior to the current lost frame, on which low pass filtering or down-sampling processing has been performed.

Further, estimating a pitch period of the current lost frame comprises:

calculating a pitch period value of the last correctly received frame prior to the current lost frame, and using the obtained pitch period value as the pitch period value of the current lost frame and to compute a maximum of normalized autocorrelation of the current lost frame.

Further, judging whether the estimated pitch period value is usable comprises:

judging whether any of the following conditions is met, and if yes, considering that the pitch period value is unusable:

(1) a cross-zero rate of the initially compensated signal of the first lost frame is larger than a first threshold $Z_1$, wherein $Z_1>0$;

(2) a ratio of a lower-frequency energy to a whole-frame energy of the last correctly received frame prior to the current lost frame is less than a second threshold $ER_1$, wherein $ER_1>0$;

(3) a spectral tilt of the last correctly received frame prior to the current lost frame is less than a third threshold TILT, wherein $0<TILT<1$; and (4) a cross-zero rate of a second half of the last correctly received frame prior to the current lost frame is larger than that of a first half of the last correctly received frame prior to the current lost frame by several times.

Further, the method further comprises:

when it is judged that any of conditions (1)-(4) is not met, judging whether the pitch period value is usable in accordance with the following criteria:

(a) when the current lost frame is within a silence segment, considering that the pitch period value is unusable;

(b) when the current lost frame is not within the silence segment and the maximum of normalized autocorrelation is larger than a fourth threshold $R_2$, considering that the pitch period value is usable, wherein $0<R_2<1$;

(c) when criteria (a) and (b) are not met and a cross-zero rate of the last correctly received frame prior to the current lost frame is larger than a fifth threshold $Z_3$, considering that the pitch period value is unusable, wherein $Z_3>0$;

(d) when criteria (a), (b) and (c) are not met and a result of a current long-time logarithm energy minus a logarithm energy of the last correctly received frame prior to the current lost frame is larger than a sixth threshold $E_4$, considering that the pitch period value is unusable, wherein $E_4>0$;

(e) when criteria (a), (b), (c) and (d) are not met, a result of the logarithm energy of the last correctly received frame prior to the current lost frame minus the current long-time logarithm energy is larger than a seventh threshold $E_5$, and the maximum of normalized autocorrelation is larger than an eighth threshold $R_3$, considering that the pitch period value is usable, wherein $E_5>0$ and $0<R_3<1$; and (f) when criteria (a), (b), (c), (d) and (e) are not met, verifying a harmonic characteristic of the last correctly received frame prior to the current lost frame, and when a value representing the harmonic characteristic is less than a ninth threshold H, considering that the pitch period value is unusable; and when the value representing the harmonic characteristic is larger than or equal to the ninth threshold H, considering that the pitch period value is usable, wherein H<1.

Further, performing waveform adjustment on the initially compensated signal with a time-domain signal of a frame prior to the current lost frame comprises:

(i) establishing a buffer with a length of $L+L_1$, wherein L is a frame length and $L_1>0$;

(ii) initializing first $L_1$ samples of the buffer, wherein the initializing comprises: when the current lost frame is a first lost frame, configuring the first $L_1$ samples of the buffer as a first $L_1$-length signal of the initially compensated signal of the current lost frame; and when the current lost frame is not the first lost frame, configuring the first $L_1$ samples of the buffer as a last $L_1$-length signal in the buffer used when performing waveform adjustment on the initially compensated signal of the previous lost frame of the current lost frame;

(iii) concatenating the last pitch period of time-domain signal of the frame prior to the current lost frame and the $L_1$-length signal in the buffer, repeatedly copying the concatenated signal into the buffer, until the buffer is filled up, and during each copy, if a length of an existing signal in the buffer is l, copying the signal to locations from $l-L_1$ to $l+T-1$ of the buffer, wherein $l>0$, T is a pitch period value, and for a resultant overlapped area with a length of $L_1$, the signal of the overlapped area is obtained by adding signals of two overlapping parts after windowing respectively;

(iv) taking the first L-length signal in the buffer as the compensated signal of the current lost frame.

Further, the method further comprises:

establishing a buffer with a length of L for a first correctly received frame after the current lost frame, filling up the buffer in accordance with the manners corresponding to steps (ii) and (iii), performing overlap-add on the signal in the buffer and the time-domain signal obtained by decoding the first correctly received frame after the current lost frame, and taking the obtained signal as a time-domain signal of the first correctly received frame after the current lost frame.

Further, performing waveform adjustment on the initially compensated signal with a time-domain signal of the frame prior to the current lost frame comprises:

establishing a buffer with a length of kL, wherein L is a frame length and $k>0$;

initializing first $L_1$ samples of the buffer, wherein $L_1>0$, and the initializing comprises: when the current lost frame is a first lost frame, configuring the first $L_1$ samples of the buffer as a first $L_1$-length signal of the initially compensated signal of the current lost frame;

concatenating the last pitch period of time-domain signal of the frame prior to the current lost frame and the $L_1$-length signal in the buffer, repeatedly copying the concatenated signal into the buffer, until the buffer is filled up, and during each copy, if a length of an existing signal in the buffer is l, copying the signal to locations from $l-L_1$ to $l+T-1$ of the buffer, wherein $l>0$, T is a pitch period value, and for a resultant overlapped area with a length of $L_1$, the signal of the overlapped area is obtained by adding signals of two overlapping parts after windowing respectively;

taking the signal in the buffer as the compensated signal from the current lost frame to a $q^{th}$ lost frame successively in an order of timing sequence, and when q is less than k, performing overlap-add on a $(q+1)^{th}$ frame of signal in the buffer and the time-domain signal obtained by decoding the first correctly received frame after the current lost frame, and taking the obtained signal as the time-domain signal of the first correctly received frame after the current lost frame; or taking first k−1 frames of signal in the buffer as the compensated signal from the current lost frame to a $(k-1)^{th}$ lost frame successively in an order of timing sequence, performing overlap-add on a $k^{th}$ frame of signal in the buffer and the initially compensated signal of a $k^{th}$ lost frame, and taking the obtained signal as the compensated signal of the $k^{th}$ lost frame.

Further, performing waveform adjustment on the initially compensated signal with a time-domain signal of a frame prior to the current lost frame comprises:

supposing that the current lost frame is an $x^{th}$ lost frame, wherein $x>0$, and when x is larger than k ($k>0$), taking the initially compensated signal of the current lost frame as the compensated signal of the current lost frame, otherwise performing the following steps:

establishing a buffer with a length of L, wherein L is a frame length;

when x equals 1, configuring the first $L_1$ samples of the buffer as a first $L_1$-length signal of the initially compensated signal of the current lost frame, wherein $L_1>0$;

when x equals 1, concatenating the last pitch period of time-domain signal of the frame prior to the current lost frame and the first $L_1$-length signal in the buffer, repeatedly copying the concatenated signal into the buffer, until the buffer is filled up to obtain a time-domain signal with a length of L, and during each copy, if the length of the existing signal in the buffer is l, copying the signal to locations from $l-L_1$ to $l+T-1$ of the buffer, wherein $l>0$, T is a pitch period value, and for the resultant overlapped area with a length of $L_1$, the signal of the overlapped area is obtained by adding signals of two overlapping parts after windowing respectively; when x is larger than 1, repeatedly copying the last pitch period of compensated signal of the frame prior to the current lost frame into the buffer without overlapping, until the buffer is filled up to obtain a time-domain signal with a length of L;

when x is less than k, taking the signal in the buffer as the compensated signal of the current lost frame; when x equals k, performing overlap-add on the signal in the buffer and the initially compensated signal of the current lost frame, and taking the obtained signal as the compensated signal of the current lost frame, for a first correctly received frame after the current lost frame, if a number of consecutively loss frames is less than k, establishing a buffer with a length of L, repeatedly copying the last pitch period of compensated signal of the frame prior to the first correctly received frame into the buffer without overlapping until the buffer is filled up, performing overlap-add on the signal in the buffer and a time-domain signal obtained by decoding the first correctly received frame, and taking the obtained signal as a time-domain signal of the first correctly received frame.

Further, the method further comprises:

after performing waveform adjustment on the initially compensated signal, multiplying the adjusted signal with a gain, and using the signal multiplied with the gain as the compensated signal of the current lost frame.

Further, during pitch search, different upper and lower limits for pitch search are used for a speech signal frame and a music signal frame.

Further, when the last correctly received frame prior to the current lost frame is the speech signal frame, it is judged whether the pitch period value of the current lost frame is usable using the above manner.

Further, when the last correctly received frame prior to the current lost frame is the music signal frame, judging whether the pitch period value of the current lost frame is usable in the following manner:

if the current lost frame is within a silence segment, considering that the pitch period value is unusable; or if the current lost frame is not within the silence segment, when a maximum of normalized autocorrelation is larger than a nineteenth threshold $R_4$, wherein $0<R_4<1$, considering that the pitch period value is usable; and when the maximum of normalized autocorrelation is not larger than $R_4$, considering that the pitch period value is unusable.

Further, the method further comprises: after obtaining the compensated signal of the current lost frame, adding a noise into the compensated signal.

Further, adding a noise into the compensated signal comprises:

passing a past signal or the initially compensated signal per se through a high-pass filter or a spectral-tilting filter to obtain a noise signal;

estimating a noise gain value of the current lost frame; and multiplying the obtained noise signal with the estimated noise gain value of the current lost frame, and adding the noise signal multiplied with the noise gain value into the compensated signal.

Further, the method further comprises:

after obtaining the compensated signal of the current lost frame, multiplying the compensated signal with a scaling factor.

Further, the method further comprises:

after obtaining the compensated signal of the current lost frame, determining whether to multiply the compensated signal of the current lost frame with the scaling factor according to a frame type of the current lost frame, and if it is determined to multiply with the scaling factor, performing an operation of multiplying the compensated signal with the scaling factor.

Further, the present document further provides a method for frame loss concealment in a transform domain, comprising:

obtaining phases and amplitudes of a plurality of frames prior to the current lost frame at various frequency points;

obtaining phases and amplitudes of the current lost frame at various frequency points by performing linear or nonlinear extrapolation on the obtained phases and amplitudes of the plurality of frames prior to the current lost frame at various frequency points; and obtaining frequency-domain coefficients of the current lost frame at various frequency points through phases and amplitudes of the current lost frame at various frequency points, and obtaining a compensated signal of the current lost frame by performing frequency-time transform.

Further, obtaining phases and amplitudes of a plurality of frames prior to the current lost frame at various frequency points; obtaining phases and amplitudes of the current lost frame at various frequency points by performing linear or nonlinear extrapolation on the obtained phases and amplitudes of the plurality of frames prior to the current lost frame at various frequency points; and obtaining frequency-domain coefficients of the current lost frame at various frequency points through phases and amplitudes of the current lost frame at various frequency points, comprises:

when the current lost frame is a $p^{th}$ frame, obtaining MDST coefficients of a $p-2^{th}$ frame and a $p-3^{th}$ frame by performing a Modified Discrete Sine Transform (MDST) algorithm on a plurality of time-domain signals prior to the current lost frame, and constituting MDCT-MDST domain complex signals using the obtained MDST coefficients of the $p-2^{th}$ frame and the $p-3^{th}$ frame and MDCT coefficients of the $p-2^{th}$ frame and the $p-3^{th}$ frame;

obtaining phases of the MDCT-MDST domain complex signals of the $p^{th}$ frame at various frequency points by performing linear extrapolation on the phases of the $p-2^{th}$ frame and the $p-3^{th}$ frame;

substituting amplitudes of the $p^{th}$ frame at various frequency points with amplitudes of the $p-2^{th}$ frame at corresponding frequency points; and deducing MDCT coefficients of the $p^{th}$ frame at various frequency points according to the phases of the MDCT-MDST domain complex signals of the $p^{th}$ frame at various frequency points and amplitudes of the $p^{th}$ frame at various frequency points.

Further, the method further comprises:

according to frame types of c recent correctly received frames prior to the current lost frame, selecting whether to perform, for various frequency points of the current lost frame, linear or nonlinear extrapolation on the phases and amplitudes of the plurality of frames prior to the current lost frame at various frequency points to obtain the phases and amplitudes of the current lost frame at various frequency points.

Further, the method further comprises:

after obtaining the compensated signal of the current lost frame, multiplying the compensated signal with a scaling factor.

Further, the method further comprises:

after obtaining the compensated signal of the current lost frame, determining whether to multiply the compensated signal of the current lost frame with the scaling factor according to a frame type of the current lost frame, and if it is determined to multiply with the scaling factor, performing an operation of multiplying the compensated signal with the scaling factor.

Further, the present document further provides a method for frame loss concealment in a transform domain, comprising:

selecting to use the above first method or the above second method to compensate for a current lost frame through a judgment algorithm.

Further, selecting to use the above first method or the above second method to compensate for a current lost frame through a judgment algorithm comprises:

judging a frame type, and if the current lost frame is a tonality frame, using the above second method to compensate for the current lost frame; and if the current lost frame is a non-tonality frame, using the above first method to compensate for the current lost frame.

Further, judging a frame type comprises:

acquiring flags of frame types of previous n correctly received frames of the current lost frame, and if a number of tonality frames in the previous n correctly received frames is larger than an eleventh threshold $n_0$, considering that the current lost frame is a tonality frame; otherwise, considering that the current lost frame is a non-tonality frame, wherein $0 \le n_0 \le n$ and $n \ge 1$.

Further, the method comprises:

Calculating a spectral flatness of the frame, and judging whether a value of the spectral flatness is less than a tenth threshold K, and if yes, considering that the frame is a tonality frame; otherwise, considering that the frame is a non-tonality frame, wherein $0 \le K \le 1$.

Further, when calculating the spectral flatness, the frequency-domain coefficients used for calculation are original frequency-domain coefficients obtained after the time-frequency transform is performed or frequency-domain coefficients obtained after performing spectral shaping on the original frequency-domain coefficients.

Further, judging a frame type comprises:

calculating the spectral flatness of the frame using original frequency-domain coefficients obtained after the time-frequency transform is performed, and frequency-domain coefficients obtained after performing spectral shaping on the original frequency-domain coefficients respectively, to obtain two spectral flatness corresponding to the frame;

setting whether the frame is a tonality frame according to whether a value of one of the obtained spectral flatness is less than the tenth threshold K; and resetting whether the frame is a tonality frame according to whether a value of the other of the obtained spectral flatness is less than another threshold K';

wherein, when the value of the spectral flatness is less than K, the frame is set as a tonality frame; otherwise, the frame is set as a non-tonality frame, and when the value of the other spectral flatness is less than K', the frame is reset as a tonality frame, wherein $0 \le K \le 1$ and $0 \le K' \le 1$.

Further, the present document provides an apparatus for compensating for a lost frame in a transform domain, comprising: a frequency-domain coefficient calculation unit, a transform unit, and a waveform adjustment unit, wherein, the frequency-domain coefficient calculation unit is configured to calculate frequency-domain coefficients of a current lost frame using frequency-domain coefficients of one or more frames prior to the current lost frame;

the transform unit is configured to perform frequency-time transform on the frequency-domain coefficients of the current lost frame calculated by the frequency-domain coefficient calculation unit to obtain an initially compensated signal of the current lost frame; and the waveform adjustment unit is configured to perform waveform adjustment on the initially compensated signal, to obtain a compensated signal of the current lost frame.

Further, the waveform adjustment unit is further configured to perform pitch period estimation on the current lost frame, and judge whether the estimated pitch period value is usable, and if the pitch period value is unusable, use the initially compensated signal of the current lost frame as the compensated signal of the current lost frame; and if the pitch period value is usable, perform waveform adjustment on the initially compensated signal with a time-domain signal of the frame prior to the current lost frame.

Further, the waveform adjustment unit comprises a pitch period estimation sub-unit, wherein, the pitch period estimation sub-unit is configured to perform pitch search on a time-domain signal of a last correctly received frame prior to the current lost frame, to obtain a pitch period value and a maximum of normalized autocorrelation of the last correctly received frame prior to the current lost frame, and use the obtained pitch period value as a pitch period value of the current lost frame; or calculate a pitch period value of the last correctly received frame prior to the current lost frame, and use the obtained pitch period value as the pitch period value of the current lost frame and to compute a maximum of normalized autocorrelation of the current lost frame.

Further, the pitch period estimation sub-unit is further configured to before performing pitch search on the time-domain signal of the last correctly received frame prior to the current lost frame, perform low pass filtering or down-sampling processing on the time-domain signal of the last correctly received frame prior to the current lost frame, and perform pitch search on the time-domain signal of the last correctly received frame prior to the current lost frame, on which low pass filtering or down-sampling processing has been performed.

Further, the waveform adjustment unit comprises a pitch period value judgment sub-unit, wherein, the pitch period value judgment sub-unit is configured to judge whether any of the following conditions is met, and if yes, consider that the pitch period value is unusable:

(1) a cross-zero rate of the initially compensated signal of the first lost frame is larger than a first threshold $Z_1$, wherein $Z_1 > 0$;

(2) a ratio of a lower-frequency energy to a whole-frame energy of the last correctly received frame prior to the current lost frame is less than a second threshold $ER_1$, wherein $ER_1 > 0$;

(3) a spectral tilt of the last correctly received frame prior to the current lost frame is less than a third threshold TILT, wherein $0 < TILT < 1$; and (4) a cross-zero rate of a second half of the last correctly received frame prior to the current lost frame is larger than that of a first half of the last correctly received frame prior to the current lost frame by several times.

Further, the pitch period value judgment sub-unit is further configured to judge whether the pitch period value is usable in accordance with the following criteria when it is judged that any of conditions (1)-(4) is not met:

(a) when the current lost frame is within a silence segment, considering that the pitch period value is unusable;

(b) when the current lost frame is not within the silence segment and the maximum of normalized autocorrelation is larger than a fourth threshold $R_2$, considering that the pitch period value is usable, wherein $0 < R_2 < 1$;

(c) when criteria (a) and (b) are not met and a cross-zero rate of the last correctly received frame prior to the current lost frame is larger than a fifth threshold $Z_3$, considering that the pitch period value is unusable, wherein $Z_3 > 0$;

(d) when criteria (a), (b) and (c) are not met and a result of a current long-time logarithm energy minus a logarithm energy of the last correctly received frame prior to the current lost frame is larger than a sixth threshold $E_4$, considering that the pitch period value is unusable, wherein $E_4 > 0$;

(e) when criteria (a), (b), (c) and (d) are not met, a result of the logarithm energy of the last correctly received frame prior to the current lost frame minus the current long-time logarithm energy is larger than a seventh threshold $E_5$, and the maximum of normalized autocorrelation is larger than an eighth threshold $R_3$, considering that the pitch period value is usable, wherein $E_5>0$ and $0<R_3<1$; and (f) when criteria (a), (b), (c), (d) and (e) are not met, verifying a harmonic characteristic of the last correctly received frame prior to the current lost frame, and when a value representing the harmonic characteristic is less than a ninth threshold H, considering that the pitch period value is unusable; and when the value representing the harmonic characteristic is larger than or equal to the ninth threshold H, considering that the pitch period value is usable, wherein $H<1$.

Further, the waveform adjustment unit comprises an adjustment sub-unit, wherein, the adjustment sub-unit is configured to (i) establish a buffer with a length of $L+L_1$, wherein L is a frame length and $L_1>0$;

(ii) initialize first $L_1$ samples of the buffer, wherein the initializing comprises: when the current lost frame is a first lost frame, configure the first $L_1$ samples of the buffer as a first $L_1$-length signal of the initially compensated signal of the current lost frame; and when the current lost frame is not the first lost frame, configure the first $L_1$ samples of the buffer as a last $L_1$-length signal in the buffer used when performing waveform adjustment on the initially compensated signal of the previous lost frame of the current lost frame;

(iii) concatenate the last pitch period of time-domain signal of the frame prior to the current lost frame and the $L_1$-length signal in the buffer, repeatedly copy the concatenated signal into the buffer, until the buffer is filled up, and during each copy, if a length of an existing signal in the buffer is l, copy the signal to locations from $l-L_1$ to $l+T-1$ of the buffer, wherein $l>0$, T is a pitch period value, and for a resultant overlapped area with a length of $L_1$, the signal of the overlapped area is obtained by adding signals of two overlapping parts after windowing respectively;

(iv) take the first L-length signal in the buffer as the compensated signal of the current lost frame.

Further, the adjustment sub-unit is further configured to establish a buffer with a length of L for a first correctly received frame after the current lost frame, fill up the buffer in accordance with the manners corresponding to steps (ii) and (iii), perform overlap-add on the signal in the buffer and the time-domain signal obtained by decoding the first correctly received frame after the current lost frame, and take the obtained signal as a time-domain signal of the first correctly received frame after the current lost frame.

Further, the waveform adjustment unit comprises an adjustment sub-unit, wherein, the adjustment sub-unit is configured to: supposing that the current lost frame is an $x^{th}$ lost frame, wherein $x>0$, and when x is larger than k ($k>0$), take the initially compensated signal of the current lost frame as the compensated signal of the current lost frame, otherwise, perform the following steps:

establishing a buffer with a length of L, wherein L is a frame length;

when x equals 1, configuring the first $L_1$ samples of the buffer as a first $L_1$-length signal of the initially compensated signal of the current lost frame, wherein $L_1>0$;

when x equals 1, concatenating the last pitch period of time-domain signal of the frame prior to the current lost frame and the first $L_1$-length signal in the buffer, repeatedly copying the concatenated signal into the buffer, until the buffer is filled up to obtain a time-domain signal with a length of L, and during each copy, if the length of the existing signal in the buffer is l, copying the signal to locations from $l-L_1$ to $l+T-1$ of the buffer, wherein $l>0$, T is a pitch period value, and for the resultant overlapped area with a length of $L_1$, the signal of the overlapped area is obtained by adding signals of two overlapping parts after windowing respectively; when x is larger than 1, repeatedly copying the last pitch period of compensated signal of the frame prior to the current lost frame into the buffer without overlapping, until the buffer is filled up to obtain a time-domain signal with a length of L;

when x is less than k, taking the signal in the buffer as the compensated signal of the current lost frame; when x equals k, performing overlap-add on the signal in the buffer and the initially compensated signal of the current lost frame, and taking the obtained signal as the compensated signal of the current lost frame, for a first correctly received frame after the current lost frame, if a number of consecutively loss frames is less than k, establishing a buffer with a length of L, repeatedly copying the last pitch period of compensated signal of the frame prior to the first correctly received frame into the buffer without overlapping until the buffer is filled up, performing overlap-add on the signal in the buffer and a time-domain signal obtained by decoding the first correctly received frame, and taking the obtained signal as a time-domain signal of the first correctly received frame.

Further, the waveform adjustment unit further comprises a gain sub-unit, wherein, the gain sub-unit is configured to after performing waveform adjustment on the initially compensated signal, multiply the adjusted signal with a gain, and use the signal multiplied with the gain as the compensated signal of the current lost frame.

Further, the pitch period estimation sub-unit is configured to use different upper and lower limits for pitch search for a speech signal frame and a music signal frame during pitch search.

Further, the pitch period value judgment sub-unit is configured to when the last correctly received frame prior to the current lost frame is the speech signal frame, judge whether the pitch period value of the current lost frame is usable using the above manner.

Further, the pitch period value judgment sub-unit is configured to when the last correctly received frame prior to the current lost frame is the music signal frame, judge whether the pitch period value of the current lost frame is usable in the following manner:

if the current lost frame is within a silence segment, considering that the pitch period value is unusable; or if the current lost frame is not within the silence segment, when a maximum of normalized autocorrelation is larger than a nineteenth threshold $R_4$, wherein $0<R_4<1$, considering that the pitch period value is usable; and when the maximum of normalized autocorrelation is not larger than $R_4$, considering that the pitch period value is unusable.

Further, the waveform adjustment unit further comprises a noise adding sub-unit, wherein, the noise adding sub-unit is configured to after obtaining the compensated signal of the current lost frame, add a noise into the compensated signal.

Further, the noise adding sub-unit is further configured to pass a past signal or the initially compensated signal per se through a high-pass filter or a spectral-tilting filter to obtain a noise signal;

estimate a noise gain value of the current lost frame; and multiply the obtained noise signal with the estimated noise gain value of the current lost frame, and add the noise signal multiplied with the noise gain value into the compensated signal.

Further, the apparatus further comprises a scaling factor unit, wherein, the scaling factor unit is configured to after the waveform adjustment unit obtains the compensated signal of the current lost frame, multiply the compensated signal with a scaling factor.

Further, the scaling factor unit is specifically configured to after the waveform adjustment unit obtains the compensated signal of the current lost frame, determine whether to multiply the compensated signal of the current lost frame with the scaling factor according to a frame type of the current lost frame, and if it is determined to multiply with the scaling factor, perform an operation of multiplying the compensated signal with the scaling factor.

Further, the present document further provides an apparatus for compensating for a lost frame in a transform domain, comprising: a first phase and amplitude acquisition unit, a second phase and amplitude acquisition unit, and a compensated signal acquisition unit, wherein, the first phase and amplitude acquisition unit is configured to obtain phases and amplitudes of a plurality of frames prior to the current lost frame at various frequency points;

the second phase and amplitude acquisition unit is configured to obtain phases and amplitudes of the current lost frame at various frequency points by performing linear or nonlinear extrapolation on the obtained phases and amplitudes of a plurality of frames prior to the current lost frame at various frequency points; and the compensated signal acquisition unit is configured to obtain frequency-domain coefficients of the current lost frame at frequency points through the phases and amplitudes of the current lost frame at various frequency points, and obtain the compensated signal of the current lost frame by performing frequency-time transform.

Further, the first phase and amplitude acquisition unit is further configured to when the current lost frame is a $p^{th}$ frame, obtain MDST coefficients of a $p-2^{th}$ frame and a $p-3^{th}$ frame by performing a Modified Discrete Sine Transform (MDST) algorithm on a plurality of time-domain signals prior to the current lost frame, and constitute MDCT-MDST domain complex signals using the obtained MDST coefficients of the $p-2^{th}$ frame and the $p-3^{th}$ frame and MDCT coefficients of the $p-2^{th}$ frame and the $p-3^{th}$ frame;

the second phase and amplitude acquisition unit is further configured to obtain phases of the MDCT-MDST domain complex signals of the $p^{th}$ frame at various frequency points by performing linear extrapolation on phases of the $p-2^{th}$ frame and the $p-3^{rd}$ frame, and substitute amplitudes of the $p^{th}$ frame at various frequency points with amplitudes of the $p-2^{th}$ frame at corresponding frequency points; and the compensated signal acquisition unit is further configured to deduce MDCT coefficients of the $p^{th}$ frame at various frequency points according to phases of the MDCT-MDST domain complex signals of the $p^{th}$ frame at various frequency points and amplitudes of the $p^{th}$ frame at various frequency points.

Further, the apparatus further comprises a frequency point selection unit, wherein, the frequency point selection unit is configured to, according to frame types of c recent correctly received frames prior to the current lost frame, select whether to perform, for various frequency points of the current lost frame, linear or nonlinear extrapolation on the phases and amplitudes of a plurality of frames prior to the current lost frame at various frequency points to obtain the phases and amplitudes of the current lost frame at various frequency points.

Further, the apparatus further comprises a scaling factor unit, wherein, the scaling factor unit is configured to after the compensated signal acquisition unit obtains the compensated signal of the current lost frame, multiply the compensated signal with a scaling factor.

Further, the scaling factor unit is further configured to after the compensated signal acquisition unit obtains the compensated signal of the current lost frame, determine whether to multiply the compensated signal of the current lost frame with the scaling factor according to a frame type of the current lost frame, and if it is determined to multiply with the scaling factor, perform an operation of multiplying the compensated signal with the scaling factor.

Further, the present document further provides an apparatus for compensating for a lost frame in a transform domain, comprising: a judgment unit, wherein, the judgment unit is configured to select to use the above first apparatus or the above second apparatus to compensate for the current lost frame through a judgment algorithm.

Further, the judgment unit is further configured to judge a frame type, and if the current lost frame is a tonality frame, use the above second apparatus to compensate for the current lost frame; and if the current lost frame is a non-tonality frame, use the above first apparatus to compensate for the current lost frame.

Further, the judgment unit is further configured to acquire flags of frame types of previous n correctly received frames of the current lost frame, and if a number of tonality frames in the previous n correctly received frames is larger than an eleventh threshold $n_0$, consider that the current lost frame is a tonality frame; otherwise, consider that the current lost frame is a non-tonality frame, wherein $0 \le n_0 \le n$ and $n \ge 1$.

Further, the judgment unit is further configured to calculate spectral flatness of the frame, and judge whether a value of the spectral flatness is less than a tenth threshold K, and if yes, consider that the frame is a tonality frame; otherwise, consider that the frame is a non-tonality frame, wherein $0 \le K \le 1$.

Further, when the judgment unit calculates the spectral flatness, the frequency-domain coefficients used for calculation are original frequency-domain coefficients obtained after the time-frequency transform is performed or frequency-domain coefficients obtained after performing spectral shaping on the original frequency-domain coefficients.

Further, the judgment unit is further configured to calculate the spectral flatness of the frame respectively using original frequency-domain coefficients obtained after the time-frequency transform is performed and frequency-domain coefficients obtained after performing spectral shaping on the original frequency-domain coefficients, to obtain two spectral flatness corresponding to the frame;

set whether the frame is a tonality frame according to whether a value of one of the obtained spectral flatness is less than the tenth threshold K; and reset whether the frame is a tonality frame according to whether a value of the other of the obtained spectral flatness is less than another threshold K';

wherein, when the value of the spectral flatness is less than K, the frame is set as a tonality frame; otherwise, the frame is set as a non-tonality frame, and when the value of the other spectral flatness is less than K', the frame is reset as a tonality frame, wherein $0 \le K \le 1$ and $0 \le K' \le 1$.

In conclusion, in the present document, it is to calculate frequency-domain coefficients of a current lost frame using frequency-domain coefficients of one or more frames prior to the current lost frame, and perform frequency-time transform on the obtained frequency-domain coefficients of the current lost frame to obtain an initially compensated signal of the current lost frame; and perform waveform adjustment on the initially compensated signal, to obtain a compensated signal of the current lost frame. In this way, a better compensation effect of the lost frame of the audio signal is achieved with a low computational complexity, and the delay is largely shortened.

PREFERRED EMBODIMENTS OF THE INVENTION

In order to make the purposes, technical schemes and advantages of the present document more clear and obvious, the embodiments of the present document will be described in detail below in conjunction with accompanying drawings. It should be illustrated that without a conflict, the embodiments in the present application and the features in the embodiments can be combined with each other randomly.

Figure 1:
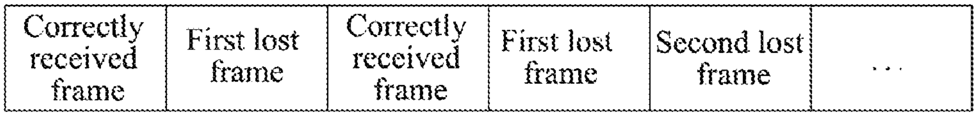
FIG. 1 is a diagram of a definition of a name of a lost frame according to the present document.

As shown in FIG. 1, a first lost frame immediately after the correctly received frame is referred to as a first lost frame, and a consecutive second lost frame immediately after the first lost frame is referred to as a second lost frame, and so on.

Embodiment One

Figure 2A:
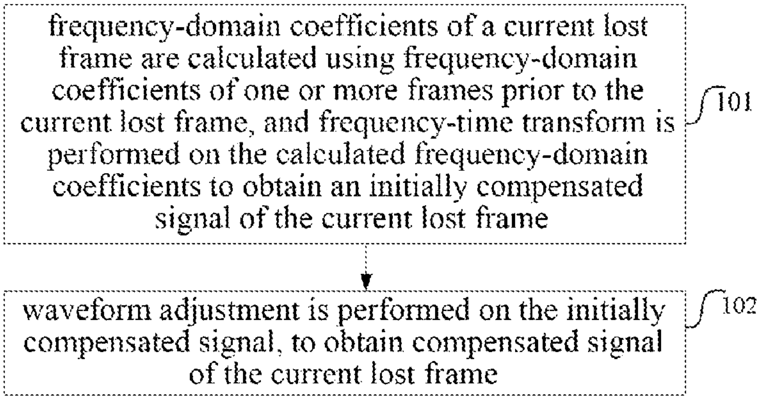
FIG. 2(A) is a flowchart of a method for frame loss concealment in a transform domain according to embodiment one of the present document.

As shown in FIG. 2 (A), a method for frame loss concealment in a transform domain according to the present embodiment comprises the following steps.

In step 101, frequency-domain coefficients of a current lost frame are calculated using frequency-domain coefficients of one or more frames prior to the current lost frame, and frequency-time transform is performed on the calculated frequency-domain coefficients to obtain an initially compensated signal of the current lost frame;

In step 102, waveform adjustment is performed on the initially compensated signal, to obtain compensated signal of the current lost frame.

Steps 101 and 102 will be described respectively in detail below in conjunction with accompanying drawings.

Figure 2B:
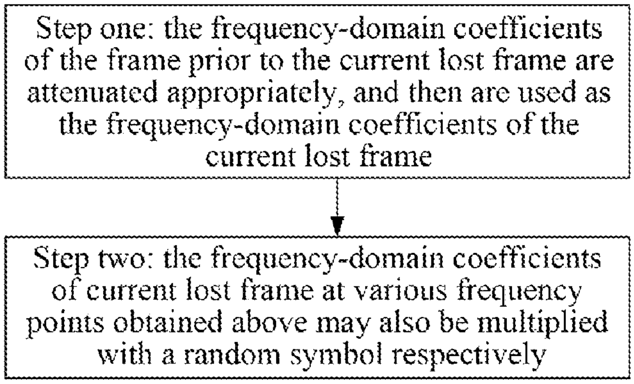
FIG. 2(B) is a diagram of a method for calculating frequency-domain coefficients of the current lost frame according to embodiment one of the present document.

As shown in FIG. 2(B), a method for calculating frequency-domain coefficients of the current lost frame further comprises the following steps.

In step one, the frequency-domain coefficients of the frame prior to the current lost frame are attenuated appropriately, and then are taken as the frequency-domain coefficients of the current lost frame, i.e., when the current lost frame is a $p^{th}$ frame, $$c^p(m)=\alpha*c^{p-1}(m),\ m=0,K,M-1;$$

wherein, $c^p(m)$ represents a frequency-domain coefficient of the $p^{th}$ frame at a frequency point m, M is the total number of the frequency points, $\alpha$ is an attenuation coefficient, $0\le\alpha\le1$, $\alpha$ may be a fixed value for each lost frame, or may also be different values for the first lost frame, the second lost frame, . . . , the $k^{th}$ lost frame etc.

A weighted mean of frequency-domain coefficients of a plurality of frames prior to the current lost frame may also be attenuated appropriately, and then are taken as the frequency-domain coefficients of the current lost frame.

In step two, preferably, the frequency-domain coefficients of current lost frame at various frequency points obtained above may also be multiplied with a random symbol respectively, to obtain new frequency-domain coefficients of current lost frame at various frequency points, i.e., $$c^p(m)=sgn(m)*c^p(m),\ m=0,K,M-1,$$

wherein, sgn(m) is a random symbol at a frequency point m.

Figure 3:
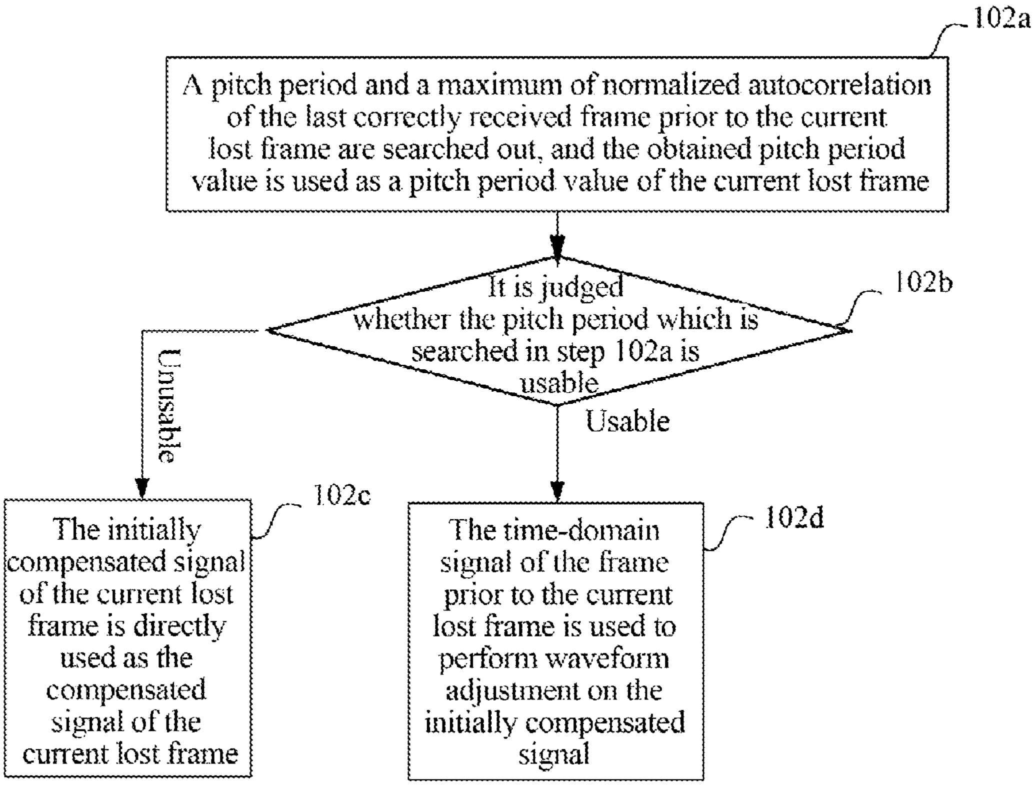
FIG. 3 is a flowchart of a method for performing waveform adjustment on an initially compensated signal according to embodiment one of the present document.

As shown in FIG. 3, a method for performing waveform adjustment on the initially compensated signal in step 102 comprises the following steps.

In 102*a*, a pitch period of the current lost frame is estimated, which is specifically as follows.

Firstly, pitch search is performed on the time-domain signal of the last correctly received frame prior to the current lost frame using an autocorrelation method, to obtain a pitch period value and a maximum of normalized autocorrelation of the last correctly received frame prior to the current lost frame, and the obtained pitch period value is taken as a pitch period value of the current lost frame, i.e., $$t\in[T_{min},T_{max}],$$

$$0<T_{min}<T_{max}<L \text{ is searched so that } \frac{\sum_{i=0}^{L-t-1}s(i)s(i+t)}{\left(\sum_{i=0}^{L-t-1}s(i)^2\times\sum_{i=t}^{L-1}s(i)^2\right)^{1/2}}$$

achieves a maximum value, which is the maximum of normalized autocorrelation, and t at this time is the pitch period value, wherein $T_{min}$ and $T_{max}$ are lower and upper limits for pitch search respectively, L is a frame length, and s(i), i=0, K, L−1 is a time-domain signal on which pitch search is to be performed;

particularly, in the process of estimating a pitch period, before performing pitch search on a time-domain signal of a last correctly received frame prior to the current lost frame, the following processing may firstly be performed: firstly performing low pass filtering or down-sampling processing on the time-domain signal of the last correctly received frame prior to the current lost frame, and then estimating a pitch period by substituting the original time-domain signal of the last correctly received frame prior to the current lost frame with the time-domain signal on which low pass filtering or down-sampling processing has been performed. The low pass filtering or down-sampling processing can reduce the influence of the high frequency components of the signal on the pitch search or reduce the complexity of the pitch search.

In the present step, the pitch period value of the last correctly received frame prior to the current lost frame may also be calculated using other methods, and the obtained pitch period value is taken as the pitch period value of the current lost frame and to compute the maximum of normalized autocorrelation of the current lost frame, for example, $$t\in[T_{min},T_{max}],0<T_{min}<T_{max}<L$$

is searched so that $$\frac{\sum_{i=0}^{L-t-1} s(i)s(i+t)}{L-t}$$

achieves a maximum value, and t at this time is the pitch period value T, and the maximum of normalized autocorrelation is $$\frac{\sum_{i=0}^{L-T-1} s(i)s(i+T)}{\left(\sum_{i=0}^{L-T-1} s^2(i)\times\sum_{i=T}^{L-1} s^2(i)\right)^{1/2}}.$$

In step 102*b*, it is judged whether the pitch period value of the current lost frame estimated in step 102*a* is usable.

Although the pitch period value of the current lost frame is estimated in step 102*a*, the pitch period value may not be usable, and whether the pitch period value is usable is judged using the following conditions.

i. if any of the following conditions is met, the pitch period value is considered to be unusable:

(1) a cross-zero rate of the initially compensated signal of the first lost frame is larger than a first threshold $Z_1$, wherein $Z_1>0$;

when the current lost frame is a first lost frame after the correctly received frame, the first lost frame in condition (1) is the current lost frame; and when the current lost frame is not the first lost frame after the correctly received frame, the first lost frame in condition (1) is a first lost frame immediately after the last correctly received frame prior to the current lost frame.

(2) a ratio of a lower-frequency energy to a whole-frame energy of the last correctly received frame prior to the current lost frame is less than a second threshold $ER_1$, wherein $ER_1>0$;

wherein, a ratio of the low frequency energy to the whole-frame energy may be defined as:

$$er=\frac{e_{low}}{e}=\frac{\sum_{m=0}^{low-1} c^2(m)}{\sum_{m=0}^{M-1} c^2(m)},$$

wherein 0<low<M, and M is the total number of the frequency points.

(3) a spectral tilt of the last correctly received frame prior to the current lost frame is less than a third threshold TILT, wherein 0<TILT<1; and wherein, the spectral tilt may be defined as:

$$\text{tilt}=\frac{\sum_{i=L/2}^{L-1} s(i)s(i-1)}{\sum_{i=L/2}^{L-1} s^2(i)},$$

s(i), i=0, K, L−1 is time-domain signal of a frame.

(4) a cross-zero rate of a second half of the last correctly received frame prior to the current lost frame is larger than that of a first half of the last correctly received frame prior to the current lost frame by several times.

ii. if none of the above-mentioned conditions is met, it is to verify whether the obtained pitch period value is usable according to the following criteria:

(a) when the current lost frame is within a silence segment, the obtained pitch period value is considered to be unusable;

whether the current lost frame is within the silence segment may be judged using the following method; however, it is not limited to the following method:

if the logarithm energy of the last correctly received frame prior to the current lost frame is less than a twelfth threshold $E_1$ or the following two conditions are met at the same time, considering that the current lost frame is within the silence segment:

(1) the maximum of normalized autocorrelation in step 102 is less than a thirteenth threshold $R_1$, wherein, $0<R_1<1$; and (2) a difference between the long-time logarithm energy at this time and the logarithm energy of the last correctly received frame prior to the current lost frame is larger than a fourteenth threshold $E_2$;

wherein, the logarithm energy is defined as:

$$e=10\log_{10}\left(\frac{1}{L}\sum_{i=0}^{L-1} s^2(i)\right),$$

the long-time logarithm energy is defined as: starting from an initial value $e_0$, wherein $e_0\geq 0$, and when the following condition is met for each frame, performing an update:

$$e_{mean}=a*e_{mean}+(1-a)*e.$$

An updating condition is that the logarithm energy e of the frame is larger than a fifteenth threshold $E_3$ and the cross-zero rate of the frame is less than a sixteenth threshold $Z_2$.

(b) when the current lost frame is not within the silence segment and the maximum of normalized autocorrelation in step 102 is larger than a fourth threshold $R_2$, wherein $0<R_2<1$, the obtained pitch period value is considered to be usable;

(c) when the above two criteria are not met and a cross-zero rate of the last correctly received frame prior to the current lost frame is larger than a fifth threshold $Z_3$, wherein $Z_3>0$, the obtained pitch period value is considered to be unusable;

(d) when the above three criteria are not met and a result of a current long-time logarithm energy minus a logarithm energy of the last correctly received frame prior to the current lost frame is larger than a sixth threshold $E_4$, wherein $E_4>0$, the obtained pitch period value is considered to be unusable;

(e) when the above four criteria are not met, a result of the logarithm energy of the last correctly received frame prior to the current lost frame minus the current long-time logarithm energy is larger than a seventh threshold $E_5$, and the maximum of normalized autocorrelation in step 102 is larger than an eighth threshold $R_3$, the obtained pitch period value is considered to be usable, wherein $E_5>0$ and $0<R_3<1$; and (f) when the above five criteria are not met, a harmonic characteristic of the last correctly received frame prior to the current lost frame is verified, and when a value harm representing the harmonic characteristic is less than a ninth threshold H, the obtained pitch period value is considered to be unusable; otherwise, the obtained pitch period value is considered to be usable, wherein H<1.

Wherein, $$\text{harm} = \frac{\sum_{i=1}^{l} c^2(h_i)}{\sum_{i=0}^{L-1} c^2(i)},$$

$h_1$ is a frequency point of a fundamental frequency, $h_i$, i=2, . . . l is an harmonic frequency point of $h_1$, $c(h_i)$ is a frequency-domain coefficient corresponding to the frequency point $h_i$. As there is a fixed quantity relationship between the pitch period values and the pitch frequencies, the value of $h_i$, i=1, . . . l can be obtained according to the pitch period value obtained in steps 102, and when $h_i$ is not an integer, the calculation of harm may be performed using a rounding method and using one or more integral frequency points around $h_i$.

In 102*c*, if the pitch period value of the current lost frame is not usable, the initially compensated signal of the current lost frame is taken as the compensated signal of the current lost frame, and if the pitch period value is usable, step 102*d* is performed;

in step 102*d*, waveform adjustment is performed on the initially compensated signal with the time-domain signal of the frame prior to the current lost frame.

Figure 4:
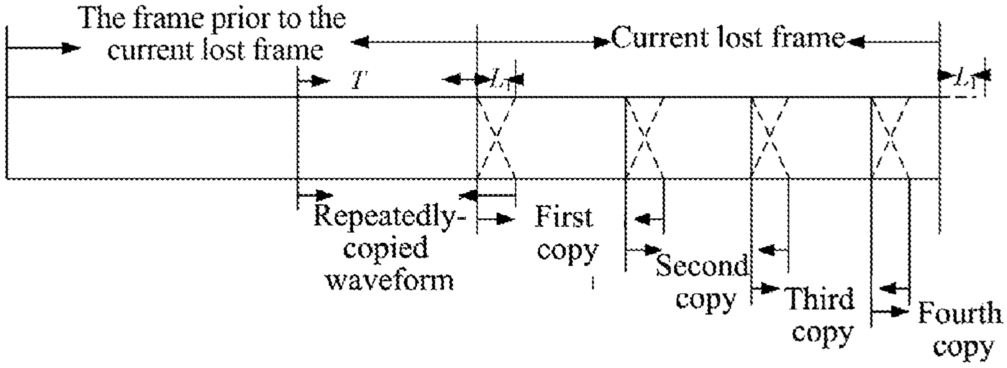
FIG. 4 is a diagram of a method for performing waveform adjustment according to embodiment one of the present document.

As shown in FIG. 4, the adjustment method comprises:

(i) in order to obtain the adjusted time-domain signal of the current lost frame, firstly it is to establish a buffer with a length of $L+L_1$, wherein L is a frame length and $L_1>0$;

(ii) then it is to initialize first $L_1$ samples of the buffer, comprising: when the current lost frame is a first lost frame, initializing the first $L_1$ samples of the buffer as first $L_1$-length data of the initially compensated signal of the current lost frame; and when the current lost frame is not the first lost frame, initializing the first $L_1$ samples of the buffer as last $L_1$-length data in the buffer used when performing waveform adjustment on the lost frame prior to the current lost frame; wherein, after the initializing, the length of the existing data in the buffer is $L_1$;

(iii) The last pitch period of time-domain signal of the frame prior to the current lost frame and the $L_1$-length signal in the buffer are concatenated, and copied repeatedly onto specified locations in the buffer, until the buffer is filled up. The specified locations in the buffer refer to: in each copy, if the length of the existing signal in the buffer is l at present, the copied signal is copied to the locations from $l-L_1$ to $l+T-1$ of the buffer, and after the copy, the length of the existing signal in the buffer becomes l+T, wherein l>0, and T is the pitch period value. During the copy, due to the pre-existence of the signal at the locations from $l-L_1$ to $l-1$ of the buffer, an overlapped area with a length of $L_1$ is formed, and the signal of the overlapped area is obtained by adding signals of two overlapping parts after windowing respectively;

(iv) it is to take the first L-length data of the signal in the buffer as the compensated signal of the current lost frame.

Preferably, in order to ensure smoothness of the time-domain waveform after compensation, when a first correctly received frame appears after the lost frame, a buffer with a length of L may also be established, then the buffer is filled up using the above methods of (ii) and (iii), and overlap-add is performed on the signal in the buffer and the time-domain signal which is obtained by actually decoding the frame, i.e., a gradually fading in and out processing is performed, and the processed signal is taken as a time-domain signal of the frame.

In the present step, a buffer with a length of kL may also be established directly when the first lost frame appears, and then the buffer is filled up using the above methods of (ii) and (iii) to obtain the time-domain signal with a length of kL directly, wherein k>0. As k is predefined when the first lost frame appears, the actual number of consecutive lost frames may be less than, or larger than or equal to k. When the actual number q of consecutive lost frames is less than k, the signal in the buffer is taken as the compensated signal of the first lost frame, the second lost frame, . . . , the $q^{th}$ lost frame successively in an order of timing sequence, and overlap-add is performed on the $(q+1)^{th}$ frame of signal in the buffer and the time-domain signal which is obtained by actually decoding the first correctly received frame after the current lost frame. When the actual number q of consecutive lost frames is larger than or equal to k, first k−1 frames of signal in the buffer is taken as the compensated signal of the first lost frame, the second lost frame, . . . , the $(k-1)^{th}$ lost frame successively in an order of timing sequence, then overlap-add is performed on the $k^{th}$ frame of signal in the buffer and the initially compensated signal of the $k^{th}$ lost frame, and the obtained signal is taken as the compensated signal of the $k^{th}$ lost frame; and no waveform adjustment is performed on lost frames after the $k^{th}$ lost frame.

Preferably, the adjusted signal may also be multiplied with a gain and then the signal is taken as the compensated signal of the lost frame. The same gain value may be used for each data point of the lost frame, or different gain values may be used for various data points of the lost frame.

The waveform adjustment method in 102*d* may further comprise a process of adding a suitable noise in the compensated signal, which is specifically as follows:

passing a signal before the initially compensated signal, i.e., a past signal, or the initially compensated signal per se through a high-pass filter or a spectral-tilting filter to obtain a noise signal; estimating a noise gain value of the current lost frame; and multiplying the noise signal with the noise gain value, and then adding the noise signal multiplied with the noise gain value and the compensated signal to obtain a new compensated signal. Wherein, the same noise gain value may be used for each data point of the lost frame, or different noise gain values may be used for various data points of the lost frame.

In embodiment one, the frequency-domain coefficients of the current lost frame are calculated using frequency-domain coefficients of one or more frames prior to the current lost frame, and frequency-time transform is performed on the calculated frequency-domain coefficients of the current lost frame to obtain the initially compensated signal of the current lost frame; waveform adjustment is performed on the initially compensated signal, to obtain the compensated signal of the current lost frame. In this way, a better compensation effect of the lost frame can be achieved with a low computational complexity without additional delay.

Embodiment 1A

As shown in FIG. 2 (A), a method for frame loss concealment in a transform domain according to the present embodiment comprises the following steps.

In step 101, frequency-domain coefficients of a current lost frame are calculated using frequency-domain coefficients of one or more frames prior to the current lost frame, and frequency-time transform is performed on the calculated frequency-domain coefficients to obtain an initially compensated signal of the current lost frame;

In step 102, waveform adjustment is performed on the initially compensated signal, to obtain compensated signal of the current lost frame.

Steps 101 and 102 will be described respectively in detail below in conjunction with accompanying drawings.

As shown in FIG. 2(B), a method for calculating frequency-domain coefficients of the current lost frame further comprises the following steps.

In step one, the frequency-domain coefficients of the frame prior to the current lost frame are attenuated appropriately, and then are taken as the frequency-domain coefficients of the current lost frame, i.e., when the current lost frame is a $p^{th}$ frame, $$c^p(m)=\alpha * c^{p-1}(m),\ m=0,K,M-1;$$

wherein, $c^p(m)$ represents a frequency-domain coefficient of the $p^{th}$ frame at a frequency point m, M is the total number of the frequency points, α is an attenuation coefficient, $0\le\alpha\le1$, α may be a fixed value for each lost frame, or may also be different values for the first lost frame, the second lost frame, . . . , the $k^{th}$ lost frame etc.

A weighted mean of frequency-domain coefficients of a plurality of frames prior to the current lost frame may also be attenuated appropriately, and then are taken as the frequency-domain coefficients of the current lost frame.

In step two, preferably, the frequency-domain coefficients of current lost frame at various frequency points obtained above may also be multiplied with a random symbol respectively, to obtain new frequency-domain coefficients of current lost frame at various frequency points, i.e., $$c^p(m)=sgn(m)*c^p(m),\ m=0,K,M-1,$$

wherein, sgn(m) is a random symbol at a frequency point m.

As shown in FIG. 3, a method for performing waveform adjustment on the initially compensated signal in step 102 comprises the following steps.

In 102*a*, a pitch period of the current lost frame is estimated, which is specifically as follows.

Firstly, pitch search is performed on the time-domain signal of the last correctly received frame prior to the current lost frame using an autocorrelation method, to obtain a pitch period value and a maximum of normalized autocorrelation of the last correctly received frame prior to the current lost frame, and the obtained pitch period value is taken as a pitch period value of the current lost frame, i.e., $$t\in[T_{min},T_{max}],0<T_{min}<T_{max}<L$$

is searched so that $$\frac{\sum_{i=0}^{L-t-1} s(i)s(i+t)}{\left(\sum_{i=0}^{L-t-1} s(i)^2 \times \sum_{i=t}^{L-1} s(i)^2\right)^{1/2}}$$

achieves a maximum value, which is the maximum of normalized autocorrelation, and t at this time is the pitch period value, wherein $T_{min}$ and $T_{max}$ are lower and upper limits for pitch search respectively, L is a frame length, and s(i), i=0, K, L−1 is a time-domain signal on which pitch search is to be performed;

particularly, in the process of estimating a pitch period, before performing pitch search on a time-domain signal of a last correctly received frame prior to the current lost frame, the following processing may firstly be performed: firstly performing low pass filtering or down-sampling processing on the time-domain signal of the last correctly received frame prior to the current lost frame, and then estimating a pitch period by substituting the original time-domain signal of the last correctly received frame prior to the current lost frame with the time-domain signal on which low pass filtering or down-sampling processing has been performed. The low pass filtering or down-sampling processing can reduce the influence of the high frequency components of the signal on the pitch search or reduce the complexity of the pitch search.

In the present step, the pitch period value of the last correctly received frame prior to the current lost frame may also be calculated using other methods, and the obtained pitch period value is taken as the pitch period value of the current lost frame and to compute the maximum of normalized autocorrelation of the current lost frame, for example, $$t\in[T_{min},T_{max}],0<T_{min}<T_{max}<L$$

is searched so that achieves a $$\frac{\sum_{i=0}^{L-t-1} s(i)s(i+t)}{L-t}$$

maximum value, and t at this time is the pitch period value T, and the maximum of normalized autocorrelation is $$\frac{\sum_{i=0}^{L-T-1} s(i)s(i+T)}{\left(\sum_{i=0}^{L-T-1} s^2(i) \times \sum_{i=T}^{L-1} s^2(i)\right)^{1/2}}.$$

In step 102*b*, it is judged whether the pitch period value of the current lost frame estimated in step 102*a* is usable.

Although the pitch period value of the current lost frame is estimated in step 102*a*, the pitch period value may not be usable, and whether the pitch period value is usable is judged using the following conditions.

i. if any of the following conditions is met, the pitch period value is considered to be unusable:

(1) a cross-zero rate of the initially compensated signal of the first lost frame is larger than a first threshold $Z_1$, wherein $Z_1>0$;

when the current lost frame is a first lost frame after the correctly received frame, the first lost frame in condition (1) is the current lost frame; and when the current lost frame is not the first lost frame after the correctly received frame, the first lost frame in condition (1) is a first lost frame immediately after the last correctly received frame prior to the current lost frame.

(2) a ratio of a lower-frequency energy to a whole-frame energy of the last correctly received frame prior to the current lost frame is less than a second threshold $ER_1$, wherein $ER_1>0$;

wherein, a ratio of the low frequency energy to the whole-frame energy may be defined as:

$$er = \frac{e_{low}}{e} = \frac{\sum_{m=0}^{low-1} c^2(m)}{\sum_{m=0}^{M-1} c^2(m)},$$

wherein 0<low<M, and M is the total number of the frequency points.

(3) a spectral tilt of the last correctly received frame prior to the current lost frame is less than a third threshold TILT, wherein 0<TILT<1; and wherein, the spectral tilt may be defined as:

$$\text{tilt} = \frac{\sum_{i=L/2}^{L-1} s(i)s(i-1)}{\sum_{i=L/2}^{L-1} s^2(i)},$$

s(i), i=0, K, L−1 is time-domain signal of a frame.

(4) a cross-zero rate of a second half of the last correctly received frame prior to the current lost frame is larger than that of a first half of the last correctly received frame prior to the current lost frame by several times.

ii. if none of the above-mentioned conditions is met, it is to verify whether the obtained pitch period value is usable according to the following criteria:

(a) when the current lost frame is within a silence segment, the obtained pitch period value is considered to be unusable;

whether the current lost frame is within the silence segment may be judged using the following method; however, it is not limited to the following method:

if the logarithm energy of the last correctly received frame prior to the current lost frame is less than a twelfth threshold $E_1$ or the following two conditions are met at the same time, considering that the current lost frame is within the silence segment:

(1) the maximum of normalized autocorrelation in step 102 is less than a thirteenth threshold $R_1$, wherein, $0<R_1<1$; and (2) a difference between the long-time logarithm energy at this time and the logarithm energy of the last correctly received frame prior to the current lost frame is larger than a fourteenth threshold $E_2$;

wherein, the logarithm energy is defined as:

$$e = 10\log_{10}\left(\frac{1}{L}\sum_{i=0}^{L-1} s^2(i)\right),$$

the long-time logarithm energy is defined as: starting from an initial value $e_0$, wherein $e_0 \geq 0$, and when the following condition is met for each frame, performing an update:

$$e_{mean} = a * e_{mean} + (1-a) * e.$$

An updating condition is that the logarithm energy e of the frame is larger than a fifteenth threshold $E_3$ and the cross-zero rate of the frame is less than a sixteenth threshold $Z_2$.

(b) when the current lost frame is not within the silence segment and the maximum of normalized autocorrelation in step 102 is larger than a fourth threshold $R_2$, wherein $0<R_2<1$, the obtained pitch period value is considered to be usable;

(c) when the above two criteria are not met and a cross-zero rate of the last correctly received frame prior to the current lost frame is larger than a fifth threshold $Z_3$, wherein $Z_3>0$, the obtained pitch period value is considered to be unusable;

(d) when the above three criteria are not met and a result of a current long-time logarithm energy minus a logarithm energy of the last correctly received frame prior to the current lost frame is larger than a sixth threshold $E_4$, wherein $E_4>0$, the obtained pitch period value is considered to be unusable;

(e) when the above four criteria are not met, a result of the logarithm energy of the last correctly received frame prior to the current lost frame minus the current long-time logarithm energy is larger than a seventh threshold $E_5$, and the maximum of normalized autocorrelation in step 102 is larger than an eighth threshold $R_3$, the obtained pitch period value is considered to be usable, wherein $E_5>0$ and $0<R_3<1$; and (f) when the above five criteria are not met, a harmonic characteristic of the last correctly received frame prior to the current lost frame is verified, and when a value harm representing the harmonic characteristic is less than a ninth threshold H, the obtained pitch period value is considered to be unusable; otherwise, the obtained pitch period value is considered to be usable, wherein H<1.

Wherein, $$\text{harm} = \frac{\sum_{i=1}^{l} c^2(h_i)}{\sum_{i=0}^{L-1} c^2(i)},$$

$h_1$ is a frequency point of a fundamental frequency, $h_i$, i=2, . . . l is an $i^{th}$ harmonic frequency point of $h_1$, $c(h_i)$ is a frequency-domain coefficient corresponding to the frequency point $h_i$. As there is a fixed quantity relationship between the pitch period values and the pitch frequencies, the value of $h_i$, i=1, . . . l can be obtained according to the pitch period value obtained in steps 102, and when $h_i$ is not an integer, the calculation of harm may be performed using a rounding method and using one or more integral frequency points around $h_i$.

In 102*c*, if the pitch period value of the current lost frame is not usable, the initially compensated signal of the current lost frame is taken as the compensated signal of the current lost frame, and if the pitch period value is usable, step 102*d* is performed;

In step 102*d*, waveform adjustment is performed on the initially compensated signal with the time-domain signal of the frame prior to the current lost frame.

the adjustment method comprises:

it is to suppose that the current lost frame is an $x^{th}$ lost frame, wherein x>0, and when x is larger than k (k>0), the initially compensated signal of the current lost frame is taken as the compensated signal of the current lost frame, otherwise the following steps are performed;

(i) a buffer is established with a length of L, wherein L is a frame length;

(ii) when x equals 1, the first $L_1$ samples of the buffer are configured as a first $L_1$-length signal of the initially compensated signal of the current lost frame, wherein $L_1$>0;

(iii) when x equals 1, the last pitch period of time-domain signal of the frame prior to the current lost frame and the first $L_1$-length signal in the buffer are concatenated, and repeatedly copied into the buffer, until the buffer is filled up to obtain a time-domain signal with a length of L, and during each copy, if the length of the existing signal in the buffer is l, the signal is copied to locations from $l-L_1$ to $l+T-1$ of the buffer, wherein l>0, T is a pitch period value, and for the resultant overlapped area with a length of $L_1$, the signal of the overlapped area is obtained by adding signals of two overlapping parts after windowing respectively; when x is larger than 1, the last pitch period of compensated signal of the frame prior to the current lost frame is repeatedly copied into the buffer without overlapping, until the buffer is filled up to obtain a time-domain signal with a length of L;

(iv) when x is less than k, the signal in the buffer is taken as the compensated signal of the current lost frame; when x equals k, overlap-add is performed on the signal in the buffer and the initially compensated signal of the current lost frame, and the obtained signal is taken as the compensated signal of the current lost frame.

Preferably, for a first correctly received frame after the current lost frame, if the number of consecutively loss frames is less than k, a buffer is established with a length of L, the last pitch period of compensated signal of the frame prior to the first correctly received frame is repeatedly copied into the buffer without overlapping until the buffer is filled up, overlap-add is performed on the signal in the buffer and a time-domain signal obtained by decoding the first correctly received frame, and the obtained signal is taken as a time-domain signal of the first correctly received frame.

Preferably, the adjusted signal may also be multiplied with a gain and then the signal is taken as the compensated signal of the lost frame. The same gain value may be used for each data point of the lost frame, or different gain values may be used for various data points of the lost frame.

The waveform adjustment method in 102*d* may further comprise a process of adding a suitable noise in the compensated signal, which is specifically as follows:

passing a signal before the initially compensated signal, i.e., a past signal, or the initially compensated signal per se through a high-pass filter or a spectral-tilting filter to obtain a noise signal; estimating a noise gain value of the current lost frame; and multiplying the noise signal with the noise gain value, and then adding the noise signal multiplied with the noise gain value and the compensated signal to obtain a new compensated signal. Wherein, the same noise gain value may be used for each data point of the lost frame, or different noise gain values may be used for various data points of the lost frame.

In embodiment 1A, the frequency-domain coefficients of the current lost frame are calculated using frequency-domain coefficients of one or more frames prior to the current lost frame, and frequency-time transform is performed on the calculated frequency-domain coefficients of the current lost frame to obtain the initially compensated signal of the current lost frame; waveform adjustment is performed on the initially compensated signal, to obtain the compensated signal of the current lost frame. In this way, a better compensation effect of the lost frame can be achieved with a low computational complexity without additional delay.

Embodiment Two

In step 201, phases and amplitudes of a plurality of frames prior to the current lost frame at various frequency points are obtained, phases and amplitudes of the current lost frame at various frequency points are obtained by performing linear or nonlinear extrapolation on the phases and amplitudes of a plurality of frames prior to the current lost frame at various frequency points; and frequency-domain coefficients of the current lost frame at frequency points are obtained through phases and amplitudes of the current lost frame at various frequency points; and in step 202, the compensated signal of the current lost frame is obtained by performing frequency-time transform.

Figure 5:
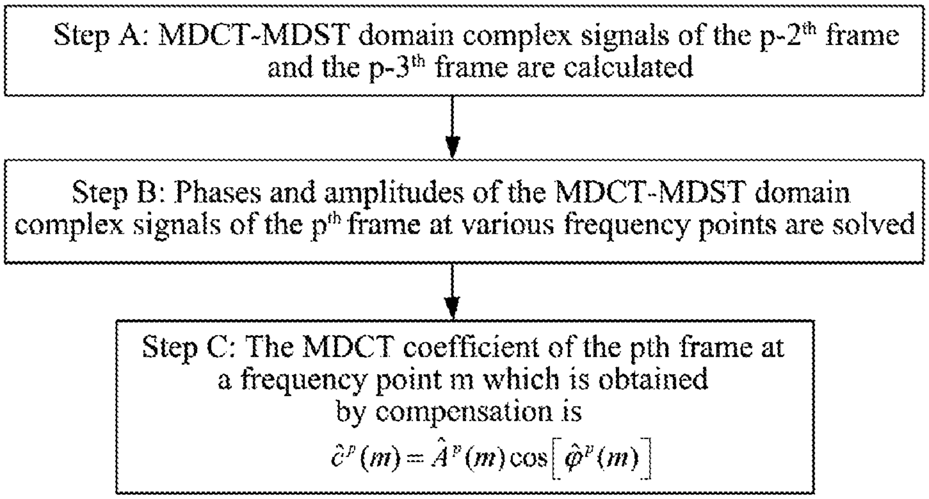
FIG. 5 is a flowchart of a method for acquiring frequency-domain coefficients of the current lost frame at various frequency points according to embodiment two of the present document.

As shown in FIG. 5, in step 201, if the frequency-domain representations of various information frames in the codec are in an MDCT domain, it needs to establish MDCT-MDST domain complex signals of a plurality of frames prior to the current lost frame using Modified Discrete Sine Transform (MDST). The method in step 201 further comprises the following steps.

In step A, when a $p^{th}$ frame is lost, MDST coefficients $s^{p-2}(m)$ and $s^{p-3}(m)$ of a $p-2^{th}$ frame and a $p-3^{th}$ frame are obtained by performing a MDST algorithm on a plurality of time-domain frame signals prior to the current lost frame, and MDCT-MDST domain complex signals are constituted by the obtained MDST coefficients of the $p-2^{th}$ frame and the $p-3^{th}$ frame and MDCT coefficients $c^{p-2}(m)$ and $c^{p-3}(m)$ of the $p-2^{th}$ frame and the $p-3^{th}$ frame:

$$v^{p-2}(m)=c^{p-2}(m)+js^{p-2}(m) \quad (1)$$

$$v^{p-3}(m)=c^{p-3}(m)+js^{p-3}(m) \quad (2)$$

wherein j is an imaginary symbol.

In step B, phases and amplitudes of the MDCT-MDST domain complex signals of the $p^{th}$ frame at various frequency points are solved according to the following equations (3)-(8):

$$\varphi^{p-2}(m)=\angle v^{p-2}(m) \quad (3)$$

$$\varphi^{p-3}(m)=\angle v^{p-3}(m) \quad (4)$$

$$A^{p-2}(m)=|v^{p-2}(m)| \quad (5)$$

$$A^{p-3}(m)=|v^{p-3}(m)| \quad (6)$$

$$\hat{\varphi}^{p}(m)=\varphi^{p-2}(m)+2[\varphi^{p-2}(m)-\varphi^{p-3}(m)] \quad (7)$$

$$\hat{A}^{p}(m)=A^{p-2}(m) \quad (8)$$

wherein, φ and A represents a phase and an amplitude respectively. For example, $\hat{\varphi}^p(m)$ is an estimated value of a phase of the $p^{th}$ frame at a frequency point m, $\varphi^{p-2}(m)$ is a phase of the $p-2^{th}$ frame at a frequency point m, $\varphi^{p-3}(m)$ is a phase of the $p-3^{th}$ frame at a frequency point m, $\hat{A}^p(m)$ is an estimated value of an amplitude of the $p^{th}$ frame at a frequency point m, $A^{p-2}(m)$ is an amplitude of the $p-2^{th}$ frame at a frequency point m, and so on.

In step C, thereby the MDCT coefficient of the $p^{th}$ frame at a frequency point m which is obtained by compensation is:

$$\hat{c}^p(m)=\hat{A}^p(m)\cos[\hat{\varphi}^p(m)].$$

In step 201, phases and amplitudes of the current lost frame at these frequency points may also be obtained by performing linear or nonlinear extrapolation for only part of frequency points of the current lost frame using phases and amplitudes of a plurality of frames prior to the current lost frame at the frequency points, thereby obtaining the frequency-domain coefficients at these frequency points; while for frequency points except for these frequency points, the frequency-domain coefficients at the frequency points can be obtained using the method in step 101, thereby obtaining the frequency-domain coefficients of the current lost frame at various frequency points. The obtained frequency-domain coefficients of the current lost frame may also be attenuated and then the frequency-time transform is performed on the coefficients.

Preferably, when the current lost frame is compensated using the method in the embodiment two, it may be selected to obtain the phases and amplitudes of the current lost frame at various frequency points by performing linear or nonlinear extrapolation for all frequency points of the current lost frame using the phases and amplitudes of a plurality of frames prior to the current lost frame at various frequency points according to the frame types of c recent correctly received frames prior to the current lost frame, or the above operation is performed for part of frequency points. For example, only when all of three correctly received frames prior to the current lost frame are tonality frames, it is selected to perform the above operation for all frequency points of the current lost frame.

In the embodiment two, the phases and amplitudes of the current lost frame at corresponding frequency points are obtained by performing linear or nonlinear extrapolation on the phases and amplitudes of a plurality of frames prior to the current lost frame at corresponding frequency points for all frequency points, or for all or part of frequency points of the current lost frame selectively according to the frame types of c recent correctly received frames prior to the current lost frame. In this way, the compensation effect of the tonality frames is largely enhanced.

Embodiment Three

The current lost frame is compensated by selecting to use the method according to embodiment one or embodiment two through a judgment algorithm.

Figure 6:
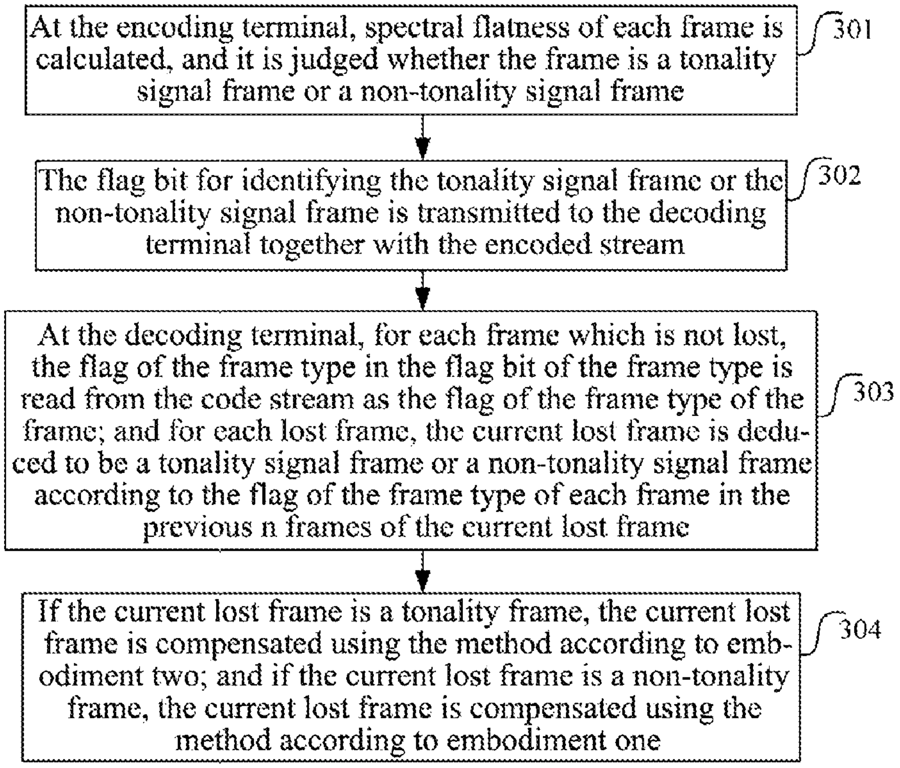
FIG. 6 is a flowchart of a method for performing judgment according to embodiment three of the present document.

As shown in FIG. 6, the judgment algorithm comprises the following steps.

In step 301, spectral flatness of each frame is calculated, and it is judged whether a value of the spectral flatness is less than a tenth threshold K, and if yes, it is considered that the frame is a tonality frame, and a flag bit of the frame type is set as a tonality type (for example, 1); and if not, it is considered that the frame is a non-tonality frame, and the flag bit of the frame type is set as a non-tonality type (for example, 0), wherein 0≤K≤1;

The method for calculating the spectral flatness is specifically as follows.

The spectral flatness $SFM_i$ of any $i^{th}$ frame is defined as a ratio of the geometric mean to the arithmetic mean of the amplitudes of the signals in the transform domain of the $i^{th}$ frame signal:

$$SFM_i = \frac{G_i}{A_i}$$

wherein, $$G_i = \left(\prod_{m=0}^{M-1} |c^i(m)|\right)^{\frac{1}{M}}$$

is the geometric mean of the amplitudes of the $i^{th}$ frame signal, $$A_i = \frac{1}{M}\sum_{m=0}^{M-1} |c^i(m)|$$

is the arithmetic mean of the amplitudes of the $i^{th}$ frame signal, $c^i(m)$ is a frequency-domain coefficient of the $i^{th}$ frame signal at a frequency point m, and M is the number of frequency points of the frequency-domain signal.

The frequency-domain coefficients may be original frequency-domain coefficients after the time-frequency transform is performed, or may also be frequency-domain coefficients after performing spectral shaping on the original frequency-domain coefficients.

Preferably, the type of the current frame may be judged by considering the original frequency-domain coefficients after the time-frequency transform is performed together with the frequency-domain coefficients after performing spectral shaping on the original frequency-domain coefficients. For example, the spectral flatness calculated by using the frequency-domain coefficients obtained after performing spectral shaping on the original frequency-domain coefficients is denoted as SFM, and the spectral flatness calculated by using the original frequency-domain coefficients on which the time-frequency transform has been performed is denoted as SFM';

if SFM is less than the tenth threshold K, the flag bit of the frame type is set as a tonality type; and if SFM is no less than the threshold K, the flag bit of the frame type is set as a non-tonality type;

in addition, if SFM' is less than another threshold K', the flag bit of the frame type is reset as a tonality type; and if SFM' is no less than K', the flag bit of the frame type is not reset, wherein, 0≤K≤1 and 0≤K'≤1.

Preferably, part of all the frequency points of the frequency-domain coefficients may be used to calculate the spectral flatness.

In step 302, step 301 may be performed at the encoding terminal, and then the obtained flag of the frame type is transmitted to the decoding terminal together with the encoded stream;

Step 301 may also be performed at the decoding terminal, and at this time, since the frequency-domain coefficients of the lost frame are lost, the spectral flatness cannot be calculated, and therefore the step is only performed for the correctly received frames.

In step 303, flags of frame types of previous n correctly received frames of the current lost frame are acquired, and if the number of tonality signal frames in the previous n correctly received frames is larger than an eleventh threshold $n_0$ ($0 \le n_0 \le n$), it is considered that the current lost frame is a tonality frame; otherwise, it is considered that the current lost frame is a non-tonality frame, wherein $n \ge 1$;

In step 304, if the current lost frame is a tonality frame, the current lost frame is compensated using the method according to embodiment two; and if the current lost frame is a non-tonality frame, the current lost frame is compensated using the method according to embodiment one.

When long frames and short frames are distinguished when the encoder performs encoding, the current lost frame may be compensated using the method according to embodiment two only when the three frames prior to the current lost frame are all long frames or the three frames prior to the current lost frame are all short frames.

In embodiment three, the current lost frame is compensated by selecting a compensation method suitable to its characteristics through a judgment algorithm in conjunction with the characteristics of the tonality frame and the non-tonality frame, so as to achieve a better compensation effect.

Embodiment Four

On the basis of embodiment three, a speech/music signal classifier may be added. When it selects to compensate for the current lost frame using the method according to embodiment one, the flag output by the speech/music classifier will influence the methods in step 102*a* and step 102*b* in embodiment one, and other steps are the same as those in embodiment three.

Figure 7:
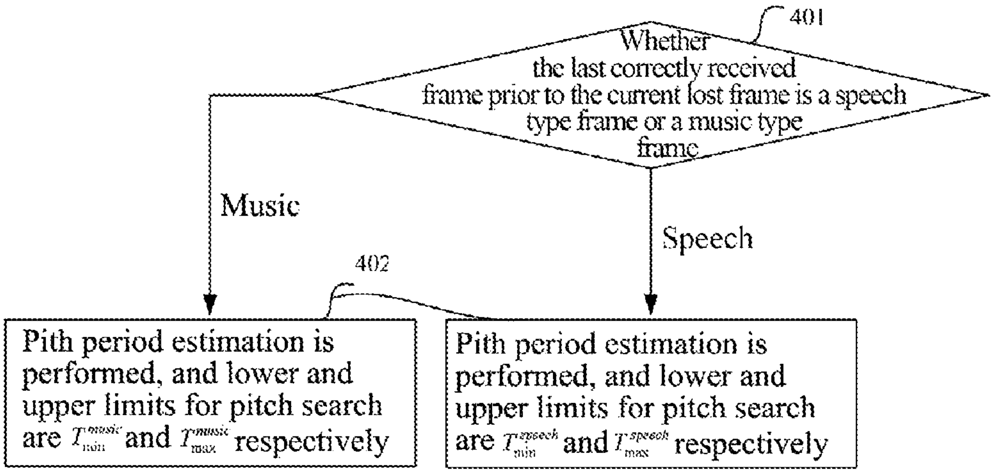
FIG. 7 is a diagram of a pitch search according to embodiment four of the present document.

As shown in FIG. 7, step 102*a* in embodiment one may be amended as follows in embodiment four.

In step 401, it is firstly judged whether the last correctly received frame prior to the current lost frame is a speech signal frame or a music signal frame.

In step 402, the pith period of the current lost frame is estimated using the same method as in 102*a*, and the only difference is that different lower and upper limits for pitch search may be used for the speech signal frame and the music signal frame. For example, for the speech signal frame, $$t \in [T_{min}^{speech}, T_{max}^{speech}], 0 < T_{min}^{speech} < T_{max}^{speech} < L$$

is searched so that $$\frac{\sum_{i=0}^{L-t-1} s(i)s(i+t)}{\left(\sum_{i=0}^{L-t-1} s(i)^2 \times \sum_{i=t}^{L-1} s(i)^2\right)^{1/2}}$$

achieves a maximum, which is the maximum of normalized autocorrelation, t at this time is the pitch period, wherein, $T_{min}^{speech}$ and $T_{max}^{speech}$ are the lower limit and the upper limit for pitch search of the speech type frame respectively, L is a frame length, s(i), i=1, K, L is a time-domain signal on which pitch search is to be performed;

for the music signal frame, $$t \in [T_{min}^{music}, T_{max}^{music}], 0 < T_{min}^{music} < T_{max}^{music} < L$$

is searched so that $$\frac{\sum_{i=0}^{L-t-1} s(i)s(i+t)}{\left(\sum_{i=0}^{L-t-1} s(i)^2 \times \sum_{i=t}^{L-1} s(i)^2\right)^{1/2}}$$

achieves a maximum, which is the maximum of normalized autocorrelation, t at this time is the pitch period, wherein, $T_{min}^{music}$ and $T_{max}^{music}$ are the lower limit and the upper limit for pitch search of the music type frame respectively, L is a frame length, s(i), i=0, K, L−1 is a time-domain signal on which pitch search is to be performed.

Figure 8:
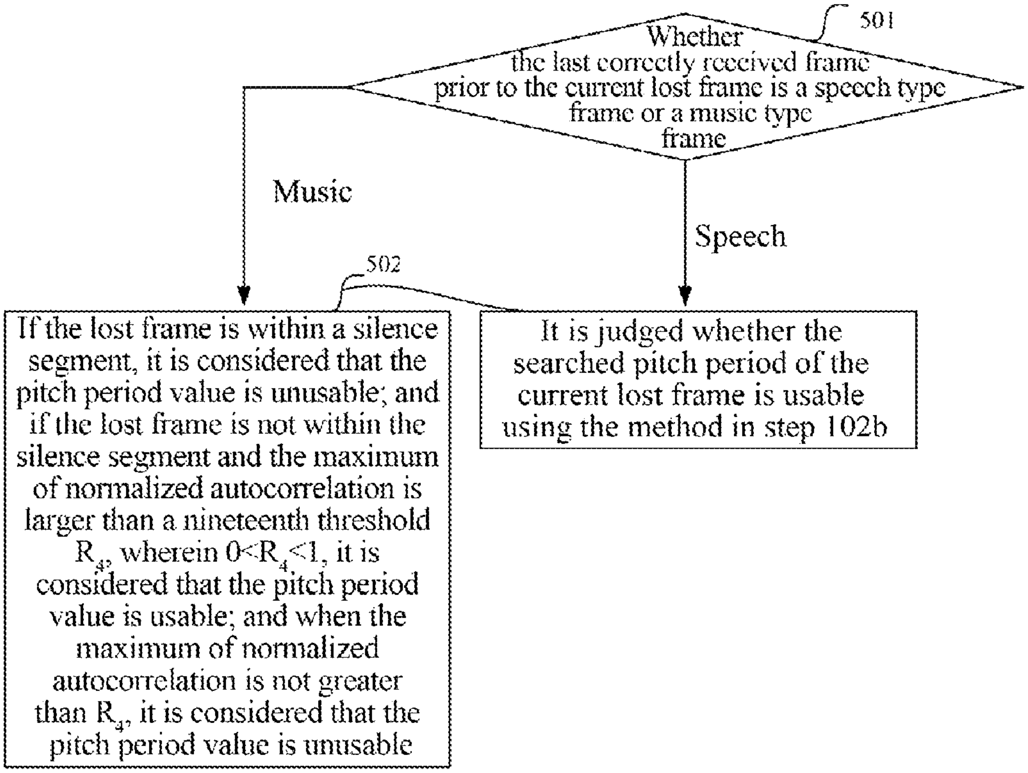
FIG. 8 is a diagram of judging whether the searched pitch period of the current lost frame is usable according to embodiment four of the present document.

As shown in FIG. 8, step 102*b* in embodiment one may be amended as follows in embodiment four.

In step 501, it is judged whether the last correctly received frame prior to the current lost frame is a speech signal frame or a music signal frame;

in step 502, if the last correctly received frame prior to the current lost frame is a speech signal frame, it is judged whether the searched pitch period of the current lost frame is usable using the method in step 102*b*; and if the last correctly received frame prior to the current lost frame is a music signal frame, it is judged whether the searched pitch period of the current lost frame is usable using the following method:

if the lost frame is within a silence segment, considering that the pitch period value is unusable;

if the lost frame is not within the silence segment and the maximum of normalized autocorrelation is larger than a nineteenth threshold $R_4$, wherein $0 < R_4 < 1$, considering that the pitch period value is usable; and when the maximum of normalized autocorrelation is not greater than $R_4$, considering that the pitch period value is unusable.

In embodiment four, when the current lost frame is compensated, the features of the speech signal frame and the music signal frame are considered fully, thereby largely enhancing the universality of the compensation method, so that the method can achieve good compensation effects in various scenarios.

Embodiment Five

Figure 9:
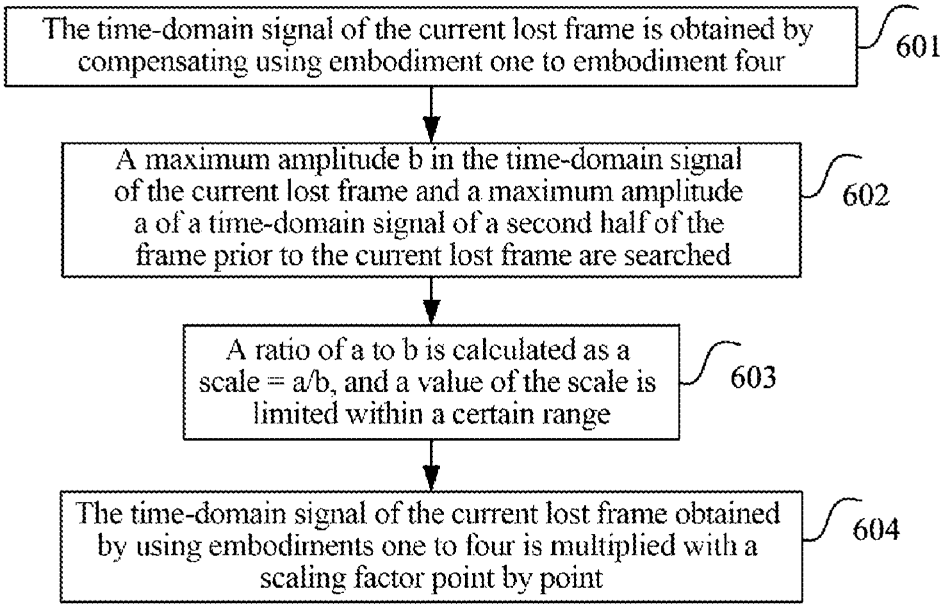
FIG. 9 is a flowchart of embodiment five of the present document.

After the compensated signal of the current lost frame is obtained by compensating using an algorithm of any of embodiment one to embodiment four, the compensated signal may also be multiplied with a scaling factor, and the compensated signal multiplied with the scaling factor is taken as a compensated signal of the current lost frame. As shown in FIG. 9, the specific method comprises the following steps.

In step 601, the compensated signal of the current lost frame is obtained by compensating using embodiment one to embodiment four;

in step 602, a maximum amplitude b in the compensated signal of the current lost frame and a maximum amplitude a of a time-domain signal of a second half of the frame prior to the current lost frame are searched;

in step 603, a ratio of a to b is calculated as a scale=a/b, and a value of the scale is limited within a certain range. For example, when the scale is larger than a seventeenth threshold $S_h$, the scale is taken as $S_h$, and when the scale is less than an eighteenth threshold $S_l$, the scale is taken as $S_l$;

in step 604, the compensated signal of the current lost frame obtained by using embodiments one to four is multiplied with a scaling factor point by point, and an initial value of the scaling factor g is 1 and is updated point by point. The updating manner is as follows:

$$g=\beta g+(1-\beta)\text{scale},\ 0\le\beta\le 1;$$

Preferably, in embodiment five, compensated signals of some frames are multiplied with a scaling factor according to the frame type of the current lost frame, and compensated signals of other frames are not multiplied with a scaling factor, and instead, the compensated signals are directly obtained.

The frame which needs to be multiplied with the scaling factor may include: a tonality frame, or a speech frame for which the pitch period is unusable and which is not tonic, and the energy of the first half of the frame prior to the current lost frame is larger than the energy of the second half of the frame prior to the current lost frame by several times.

In embodiment five, in the compensation method, a gain adjustment is added, to stabilize the compensation energy and reduce the compensation noise.

Figure 10:
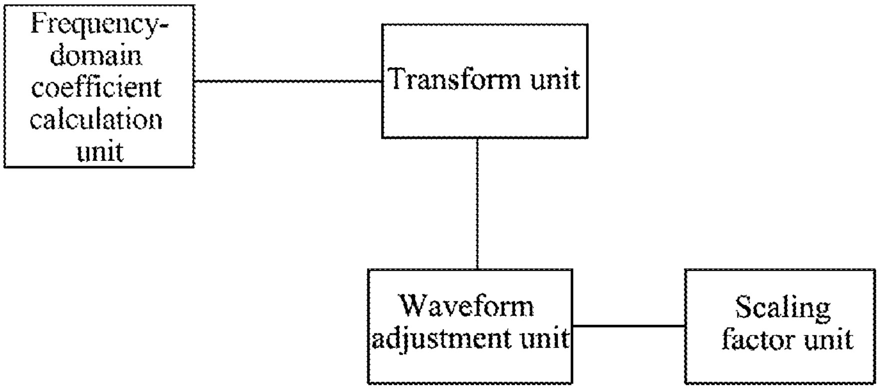
FIG. 10 is a diagram of architecture of an apparatus for compensating for a lost frame in a transform domain according to an embodiment of the present document.

As shown in FIG. 10, the present embodiment further provides an apparatus for compensating for a lost frame in a transform domain, further comprising: a frequency-domain coefficient calculation unit, a transform unit, and a waveform adjustment unit, wherein, the frequency-domain coefficient calculation unit is configured to calculate frequency-domain coefficients of a current lost frame using frequency-domain coefficients of one or more frames prior to the current lost frame;

the transform unit is configured to perform frequency-time transform on the frequency-domain coefficients of the current lost frame calculated by the frequency-domain coefficient calculation unit to obtain an initially compensated signal of the current lost frame; and the waveform adjustment unit is configured to perform waveform adjustment on the initially compensated signal, to obtain a compensated signal of the current lost frame.

The waveform adjustment unit is further configured to perform pitch period estimation on the current lost frame, and judge whether the estimated pitch period value is usable, and if the pitch period value is unusable, use the initially compensated signal of the current lost frame as a compensated signal of the current lost frame; and if the pitch period value is usable, perform waveform adjustment on the initially compensated signal with a time-domain signal of a frame prior to the current lost frame.

Figure 11:
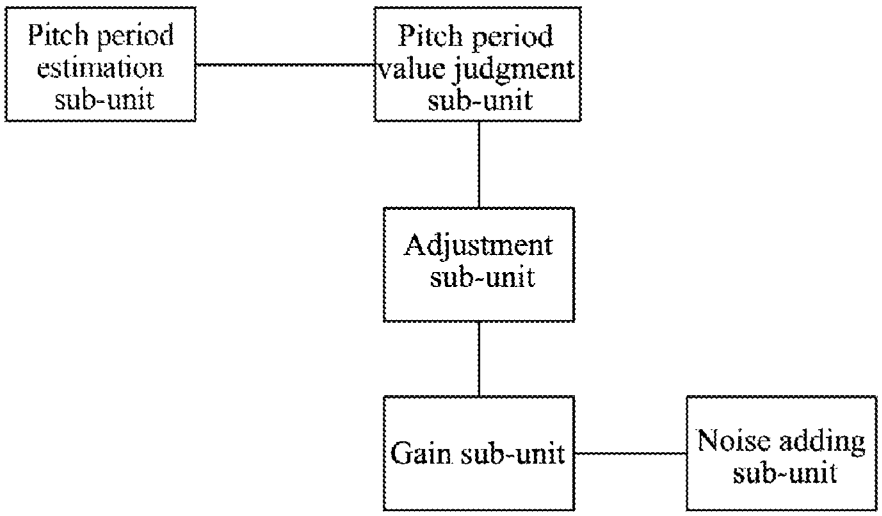
FIG. 11 is a diagram of architecture of a waveform adjustment unit in the apparatus according to an embodiment of the present document.

As shown in FIG. 11, the waveform adjustment unit comprises a pitch period estimation sub-unit, wherein, the pitch period estimation sub-unit is configured to perform pitch search on a time-domain signal of a last correctly received frame prior to the current lost frame, to obtain a pitch period value and a maximum of normalized autocorrelation of the last correctly received frame prior to the current lost frame, and use the obtained pitch period value as a pitch period value of the current lost frame; or calculate a pitch period value of the last correctly received frame prior to the current lost frame as a pitch period value of the current lost frame, and calculate a maximum of normalized autocorrelation of the current lost frame using the calculated pitch period value.

The pitch period estimation sub-unit is further configured to, before performing pitch search on the time-domain signal of the last correctly received frame prior to the current lost frame, perform low pass filtering or down-sampling processing on the time-domain signal of the last correctly received frame prior to the current lost frame, and perform pitch search on the time-domain signal of the last correctly received frame prior to the current lost frame, on which low pass filtering or down-sampling processing has been performed.

The waveform adjustment unit comprises a pitch period value judgment sub-unit, wherein, the pitch period value judgment sub-unit is configured to judge whether any of the following conditions is met, and if yes, consider that the pitch period value is unusable:

(1) a cross-zero rate of the initially compensated signal of the first lost frame is larger than a first threshold $Z_1$, wherein $Z_1>0$;

(2) a ratio of a lower-frequency energy to a whole-frame energy of the last correctly received frame prior to the current lost frame is less than a second threshold $ER_1$, wherein $ER_1>0$;

(3) a spectral tilt of the last correctly received frame prior to the current lost frame is less than a third threshold TILT, wherein 0<TILT<1; and (4) a cross-zero rate of a second half of the last correctly received frame prior to the current lost frame is larger than that of a first half of the last correctly received frame prior to the current lost frame by several times.

The pitch period value judgment sub-unit is further configured to judge whether the pitch period value is usable in accordance with the following criteria when it is judged that any of conditions (1)-(4) is not met:

(a) when the current lost frame is within a silence segment, considering that the pitch period value is unusable;

(b) when the current lost frame is not within the silence segment and the maximum of normalized autocorrelation is larger than a fourth threshold $R_2$, considering that the pitch period value is usable, wherein $0<R_2<1$;

(c) when criteria (a) and (b) are not met and a cross-zero rate of the last correctly received frame prior to the current lost frame is larger than a fifth threshold $Z_3$, considering that the pitch period value is unusable, wherein $Z_3>0$;

(d) when criteria (a), (b) and (c) are not met and a result of a current long-time logarithm energy minus a logarithm energy of the last correctly received frame prior to the current lost frame is larger than a sixth threshold $E_4$, considering that the pitch period value is unusable, wherein $E_4>0$;

(e) when criteria (a), (b), (c) and (d) are not met, a result of the logarithm energy of the last correctly received frame prior to the current lost frame minus the current long-time logarithm energy is larger than a seventh threshold $E_5$, and the maximum of normalized autocorrelation is larger than an eighth threshold $R_3$, considering that the pitch period value is usable, wherein $E_5>0$ and $0<R_3<1$; and (f) when criteria (a), (b), (c), (d) and (e) are not met, verifying a harmonic characteristic of the last correctly received frame prior to the current lost frame, and when a value representing the harmonic characteristic is less than a ninth threshold H, considering that the pitch period value is unusable; and when a value representing the harmonic characteristic is larger than or equal to the ninth threshold H, considering that the pitch period value is usable, wherein H<1.

The waveform adjustment unit comprises an adjustment sub-unit, wherein, the adjustment sub-unit is configured to (i) establish a buffer with a length of $L+L_1$, wherein L is a frame length and $L_1>0$;

(ii) initialize first $L_1$ samples of the buffer, wherein the initializing comprises: when the current lost frame is a first lost frame, configure the first $L_1$ samples of the buffer as a first $L_1$-length signal of the initially compensated signal of the current lost frame; and when the current lost frame is not the first lost frame, configure the first $L_1$ samples of the buffer as a last $L_1$-length signal in the buffer used when performing waveform adjustment on the initially compensated signal of the previous lost frame of the current lost frame;

(iii) concatenate the last pitch period of time-domain signal of the frame prior to the current lost frame and the $L_1$-length signal in the buffer, repeatedly copy the concatenated signal into the buffer, until the buffer is filled up, and during each copy, if a length of an existing signal in the buffer is l, copy the signal to locations from $l-L_1$ to $l+T-1$ of the buffer, wherein $l>0$, T is a pitch period value, and for a resultant overlapped area with a length of $L_1$, the signal of the overlapped area is obtained by adding signals of two overlapping parts after windowing respectively;

(iv) take the first L-length signal in the buffer as the compensated signal of the current lost frame.

The adjustment sub-unit is further configured to establish a buffer with a length of L for a first correctly received frame after the current lost frame, fill up the buffer in accordance with the manners corresponding to steps (ii) and (iii), perform overlap-add on the signal in the buffer and the time-domain signal obtained by decoding the first correctly received frame after the current lost frame, and take the obtained signal as a time-domain signal of the first correctly received frame after the current lost frame.

Alternatively, the adjustment sub-unit is configured to:

supposing that the current lost frame is an $x^{th}$ lost frame, wherein $x>0$, and when x is larger than k ($k>0$), take the initially compensated signal of the current lost frame as the compensated signal of the current lost frame, otherwise, perform the following steps:

establishing a buffer with a length of L, wherein L is a frame length;

when x equals 1, configuring the first $L_1$ samples of the buffer as a first $L_1$-length signal of the initially compensated signal of the current lost frame, wherein $L_1>0$;

when x equals 1, concatenating the last pitch period of time-domain signal of the frame prior to the current lost frame and the first $L_1$-length signal in the buffer, repeatedly copying the concatenated signal into the buffer, until the buffer is filled up to obtain a time-domain signal with a length of L, and during each copy, if the length of the existing signal in the buffer is l, copying the signal to locations from $l-L_1$ to $l+T-1$ of the buffer, wherein $l>0$, T is a pitch period value, and for the resultant overlapped area with a length of $L_1$, the signal of the overlapped area is obtained by adding signals of two overlapping parts after windowing respectively; when x is larger than 1, repeatedly copying the last pitch period of compensated signal of the frame prior to the current lost frame into the buffer without overlapping, until the buffer is filled up to obtain a time-domain signal with a length of L;

when x is less than k, taking the signal in the buffer as the compensated signal of the current lost frame; when x equals k, performing overlap-add on the signal in the buffer and the initially compensated signal of the current lost frame, and taking the obtained signal as the compensated signal of the current lost frame, for a first correctly received frame after the current lost frame, if a number of consecutively loss frames is less than k, establishing a buffer with a length of L, repeatedly copying the last pitch period of compensated signal of the frame prior to the first correctly received frame into the buffer without overlapping until the buffer is filled up, performing overlap-add on the signal in the buffer and a time-domain signal obtained by decoding the first correctly received frame, and taking the obtained signal as a time-domain signal of the first correctly received frame.

The waveform adjustment unit further comprises a gain sub-unit, wherein, the gain sub-unit is configured to after performing waveform adjustment on the initially compensated signal, multiply the adjusted signal with a gain, and use the signal multiplied with the gain as the compensated signal of the current lost frame.

The pitch period estimation sub-unit is configured to use different upper and lower limits for pitch search for the speech signal frame and the music signal frame during pitch search.

The pitch period value judgment sub-unit is configured to when the last correctly received frame prior to the current lost frame is a speech signal frame, judge whether the pitch period value of the current lost frame is usable using the above manner.

The pitch period value judgment sub-unit is configured to when the last correctly received frame prior to the current lost frame is a music signal frame, judge whether the pitch period value of the current lost frame is usable in the following manner:

if the current lost frame is within a silence segment, considering that the pitch period value is unusable; or if the current lost frame is not within the silence segment, when a maximum of normalized autocorrelation is larger than a nineteenth threshold $R_4$, wherein $0<R_4<1$, considering that the pitch period value is usable; and when the maximum of normalized autocorrelation is not larger than $R_4$, considering that the pitch period value is unusable.

The waveform adjustment unit further comprises a noise adding sub-unit, wherein, the noise adding sub-unit is configured to after obtaining the compensated signal of the current lost frame, add a noise in the compensated signal.

The noise adding sub-unit is further configured to pass a past signal or the initially compensated signal per se through a high-pass filter or a spectral-tilting filter to obtain a noise signal;

estimate a noise gain value of the current lost frame; and multiply the obtained noise signal with the estimated noise gain value of the current lost frame, and add the noise signal multiplied with the noise gain value into the compensated signal.

The apparatus further comprises a scaling factor unit, wherein, the scaling factor unit is configured to after the waveform adjustment unit obtains the compensated signal of the current lost frame, multiply the compensated signal with a scaling factor.

The scaling factor unit is further configured to after the waveform adjustment unit obtains the compensated signal of the current lost frame, determine whether to multiply compensated signal of the current lost frame with the scaling factor according to the frame type of the current lost frame, and if it is determined to multiply with the scaling factor, perform an operation of multiplying the compensated signal with the scaling factor.

Figure 12:
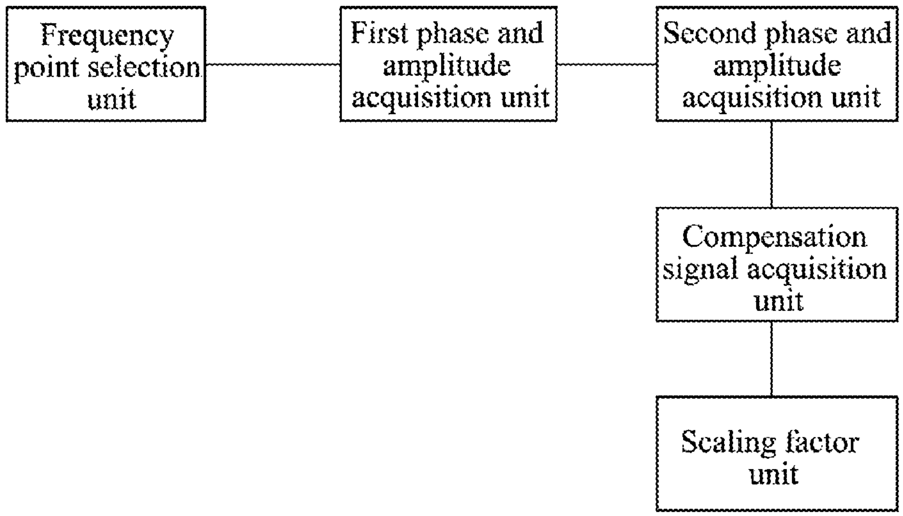
FIG. 12 is a diagram of architecture of another apparatus for compensating for a lost frame in a transform domain according to an embodiment of the present document.

As shown in FIG. 12, the present embodiment further provides an apparatus for compensating for a lost frame in a transform domain, comprising: a first phase and amplitude acquisition unit, a second phase and amplitude acquisition unit, and a compensated signal acquisition unit, wherein, the first phase and amplitude acquisition unit is configured to obtain phases and amplitudes of a plurality of frames prior to the current lost frame at various frequency points;

the second phase and amplitude acquisition unit is configured to obtain phases and amplitudes of the current lost frame at various frequency points by performing linear or nonlinear extrapolation on the obtained phases and amplitudes of a plurality of frames prior to the current lost frame at various frequency points; and the compensated signal acquisition unit is configured to obtain frequency-domain coefficients of the current lost frame at frequency points through the phases and amplitudes of the current lost frame at various frequency points, and obtain the compensated signal of the current lost frame by performing frequency-time transform.

The first phase and amplitude acquisition unit is further configured to, when the current lost frame is a $p^{th}$ frame, obtain MDST coefficients of a $p-2^{th}$ frame and a $p-3^{th}$ frame by performing a Modified Discrete Sine Transform (MDST) algorithm on a plurality of time-domain signals prior to the current lost frame, and constitute MDCT-MDST domain complex signals using the obtained MDST coefficients of the $p-2^{th}$ frame and the $p-3^{th}$ frame and MDCT coefficients of the $p-2^{th}$ frame and the $p-3^{th}$ frame;

the second phase and amplitude acquisition unit is further configured to obtain phases of the MDCT-MDST domain complex signals of the $p^{th}$ frame at various frequency points by performing linear extrapolation on the phases of the $p-2^{th}$ frame and the $p-3^{th}$ frame, and substitute amplitudes of the $p^{th}$ frame at various frequency points with amplitudes of the $p-2^{th}$ frame at corresponding frequency points; and the compensated signal acquisition unit is further configured to deduce MDCT coefficients of the $p^{th}$ frame at various frequency points according to the phases of the MDCT-MDST domain complex signals of the $p^{th}$ frame at various frequency points and amplitudes of the $p^{th}$ frame at various frequency points.

The apparatus further comprises: a frequency point selection unit, wherein, the frequency point selection unit is configured to, according to the frame types of c recent correctly received frames prior to the current lost frame, select whether to perform, for various frequency points of the current lost frame, linear or nonlinear extrapolation on the phases and amplitudes of a plurality of frames prior to the current lost frame at various frequency points to obtain the phases and amplitudes of the current lost frame at various frequency points.

The apparatus further comprises a scaling factor unit, wherein, the scaling factor unit is configured to after the compensated signal acquisition unit obtains the compensated signal of the current lost frame, multiply the compensated signal with the scaling factor.

The scaling factor unit is further configured to after the compensated signal acquisition unit obtains the compensated signal of the current lost frame, determine whether to multiply the compensated signal of the current lost frame with the scaling factor according to the frame type of the current lost frame, and if it is determined to multiply with the scaling factor, perform an operation of multiplying the compensated signal with the scaling factor.

The present embodiment further provides an apparatus for compensating for a lost frame in a transform domain, comprising: a judgment unit, wherein, the judgment unit is configured to select to use the apparatus in FIG. 10 or FIG. 12 to compensate for the current lost frame through a judgment algorithm.

The judgment unit is further configured to judge a frame type, and if the current lost frame is a tonality frame, use the apparatus in FIG. 12 to compensate for the current lost frame; and if the current lost frame is a non-tonality frame, use the apparatus in FIG. 10 to compensate for the current lost frame.

The judgment unit is further configured to acquire flags of frame types of previous n correctly received frames of the current lost frame, and if the number of tone frames in the previous n correctly received frames is larger than an eleventh threshold $n_0$, consider that the current lost frame is a tonality frame; otherwise, consider that the current lost frame is a non-tonality frame, wherein $0 \le n_0 \le n$ and $n \ge 1$.

The judgment unit is further configured to calculate spectral flatness of the frame, and judge whether a value of the spectral flatness is less than a tenth threshold K, and if yes, consider that the frame is a tonality frame; otherwise, consider that the frame is a non-tonality frame, wherein $0 \le K \le 1$.

When the judgment unit calculates the spectral flatness, the frequency-domain coefficients used for calculation are original frequency-domain coefficients obtained after the time-frequency transform is performed or frequency-domain coefficients obtained after performing spectral shaping on the original frequency-domain coefficients.

The judgment unit is further configured to calculate the spectral flatness of the frame respectively using original frequency-domain coefficients obtained after the time-frequency transform is performed and frequency-domain coefficients obtained after performing spectral shaping on the original frequency-domain coefficients, to obtain two spectral flatness corresponding to the frame;

set whether the frame is a tonality frame according to whether a value of one of the obtained spectral flatness is less than the tenth threshold K; and reset whether the frame is a tonality frame according to whether a value of the other of the obtained spectral flatness is less than another threshold K';

wherein, when the value of the spectral flatness is less than K, the frame is set as a tonality frame; otherwise, the frame is set as a non-tonality frame, and when the value of the other spectral flatness is less than K', the frame is reset as a tonality frame, wherein $0 \le K \le 1$ and $0 \le K' \le 1$.

Of course, the present document can have a plurality of other embodiments. Without departing from the spirit and substance of the present document, those skilled in the art can make various corresponding changes and variations according to the present document, and all these corresponding changes and variations should belong to the protection scope of the appended claims in the present document.

A person having ordinary skill in the art should understand that all or part of the steps in the above method can be implemented by programs instructing related hardware, and the programs can be stored in a computer readable storage medium, such as a read-only memory, a disk, or a disc etc. Alternatively, all or part of the steps in the aforementioned embodiments can also be implemented with one or more integrated circuits. Accordingly, various modules/units in the aforementioned embodiments can be implemented in a form of hardware, or can also be implemented in a form of software functional modules. The present document is not limited to any particular form of combination of hardware and software.

What is claimed is:

1. A method for frame loss concealment in a transform domain, comprising the following steps that are executed by processor in an apparatus for compensating for a lost frame:

obtaining an initially compensated signal of a current lost frame by calculating frequency-domain coefficients of the current lost frame using frequency-domain coefficients of one or more frames prior to the current lost frame, and performing frequency-time transform on the calculated frequency-domain coefficients of the current lost frame;

obtaining an estimated pitch period value by estimating a pitch period of the current lost frame; and obtaining a compensated signal of the current lost frame by;

judging whether the estimated pitch period value is usable, and if the pitch period value is unusable, taking the initially compensated signal of the current lost frame as the compensated signal of the current lost frame; and if the pitch period value is usable, performing waveform adjustment on the initially compensated signal with a time-domain signal of the frame prior to the current lost frame as the compensated signal of the current lost frame;

wherein, judging whether the estimated pitch period value is usable comprises:

judging whether any of the following conditions is met, and if yes, considering that the pitch period value is unusable:

(1) a ratio of a lower-frequency energy to a whole-frame energy of the last correctly received frame prior to the current lost frame is less than a second threshold $ER_1$, wherein $ER_1>0$;

(2) a spectral tilt of the last correctly received frame prior to the current lost frame is less than a third threshold TILT, wherein 0<TILT<1; and (3) a cross-zero rate of a second half of the last correctly received frame prior to the current lost frame is larger than that of a first half of the last correctly received frame prior to the current lost frame by several times.

2. The method according to claim 1, wherein, estimating a pitch period of the current lost frame comprises: performing pitch search on a time-domain signal of a last correctly received frame prior to the current lost frame, to obtain a pitch period value and a maximum of normalized autocorrelation of the last correctly received frame prior to the current lost frame, and taking the obtained pitch period value as a pitch period value of the current lost frame.

3. The method according to claim 2, further comprising: before performing pitch search on the time-domain signal of the last correctly received frame prior to the current lost frame, performing low pass filtering or down-sampling processing on the time-domain signal of the last correctly received frame prior to the current lost frame, and performing pitch search on the time-domain signal of the last correctly received frame prior to the current lost frame, on which low pass filtering or down-sampling processing has been performed.

4. The method according to claim 1, wherein, estimating a pitch period of the current lost frame comprises: calculating a pitch period value of the last correctly received frame prior to the current lost frame, and using the obtained pitch period value as the pitch period value of the current lost frame and to compute a maximum of normalized autocorrelation of the current lost frame.

5. The method according to claim 1, further comprising: when it is judged that any of conditions (I)-(4) is not met, judging whether the pitch period value is usable in accordance with the following criteria: (a) when the current lost frame is within a silence segment, considering that the pitch period value is unusable; (b) when the current lost frame is not within the silence segment and the maximum of normalized autocorrelation is larger than a fourth threshold $R_2$, considering that the pitch period value is usable, wherein $0<R_2<0$;

(d) when criteria (a), (b) and (c) are not met and a result of a current long-time logarithm energy minus a logarithm energy of the last correctly received frame prior to the current lost frame is larger than a sixth threshold $E_4$, considering that the pitch period value is unusable, wherein $E_4>0$;

(e) when criteria (a), (b), (c) and (d) are not met, a result of the logarithm energy of the last correctly received frame prior to the current lost frame minus the current long-time logarithm energy is larger than a seventh threshold $E_5$, and the maximum of normalized autocorrelation is larger than an eighth threshold $R_3$, considering that the pitch period value is usable, wherein $E_5>0$ and $0<R_3<1$: and (f) when criteria (a), (b), (c), (d) and (e) are not met, verifying a harmonic characteristic of the last correctly received frame prior to the current lost frame, and when a value representing the harmonic characteristic is less than a ninth threshold H, considering that the pitch period value is unusable; and when the value representing the harmonic characteristic is larger than or equal to the ninth threshold H, considering that the pitch period value is usable, wherein H<1.

6. The method according to claim 1, wherein, performing waveform adjustment on the initially compensated signal with a time-domain signal of a frame prior to the current lost frame comprises:

(i) establishing a buffer with a length of $L+L_1$, wherein L is a frame length and $L_1>0$;

(ii) initializing first $L_1$ samples of the buffer, wherein the initializing comprises: when the current lost frame is a first lost frame, configuring the first $L_1$ samples of the buffer as a first $L_1$-length signal of the initially compensated signal of the current lost frame; and when the current lost frame is not the first lost frame, configuring the first $L_1$ samples of the buffer as a last $L_1$-length signal in the buffer used when performing waveform adjustment on the initially compensated signal of the lost frame prior to the current lost frame;

(iii) concatenating the last pitch period of time-domain signal of the frame prior to the current lost frame and the $L_1$-length signal in the buffer, repeatedly copying the concatenated signal into the buffer, until the buffer is filled up, and during each copy, if a length of an existing signal in the buffer is l, copying the signal to locations from $1-L_1$ to $l+T-1$ of the buffer, wherein l>0, T is a pitch period value, and for a resultant overlapped area with a length of $L_1$, the signal of the overlapped area is obtained by adding signals of two overlapping parts after windowing respectively;

(iv) taking the first L-length signal in the buffer as the compensated signal of the current lost frame.

7. The method according to claim 6, further comprising: establishing a buffer with a length of L for a first correctly received frame after the current lost frame, filling up the buffer in accordance with the manners corresponding to steps (ii) and (iii), performing overlap-add on the signal in the buffer and the time-domain signal obtained by decoding the first correctly received frame after the current lost frame, and taking the obtained signal as a time-domain signal of the first correctly received frame after the current lost frame.

8. The method according to claim 1, wherein, performing waveform adjustment on the initially compensated signal with a time-domain signal of a frame prior to the current lost frame comprises:

establishing a buffer with a length of kL, wherein L is a frame length and k>0;

initializing first $L_1$ samples of the buffer, wherein $L_1>0$, and the initializing comprises: when the current lost frame is a first lost frame, configuring the first $L_1$ samples of the buffer as a first $L_1$-length signal of the initially compensated signal of the current lost frame;

concatenating the last pitch period of time-domain signal of the frame prior to the current lost frame and the $L_1$-length signal in the buffer, repeatedly copying the concatenated signal into the buffer, until the buffer is filled up to obtain a time-domain signal with a length of kL, and during each copy, if the length of the existing signal in the buffer is l, copying the signal to locations from $l-L_1$ to $l+T-1$ of the buffer, wherein l>0, T is a pitch period value, and for the resultant overlapped area with a length of $L_1$, the signal of the overlapped area is obtained by adding signals of two overlapping parts after windowing respectively;

taking the signal in the buffer as the compensated signal from the current lost frame to a $q^{th}$ lost frame successively in an order of timing sequence, and when q is less than k, performing overlap-add on a $(q+1)^{th}$ frame of signal in the buffer and the time-domain signal obtained by decoding the first correctly received frame after the current lost frame, and taking the obtained signal as the time-domain signal of the first correctly received frame after the current lost frame; or taking first k−1 frames of signal in the buffer as the compensated signal from the current lost frame to a $(k-1)^{th}$ lost frame successively in an order of timing sequence, performing overlap-add on a $k^{th}$ frame of signal in the buffer and the initially compensated signal of a $k^{th}$ lost frame, and taking the obtained signal as the compensated signal of the $k^{th}$ lost frame.

9. The method according to claim 2, wherein, during pitch search, different upper and lower limits for pitch search are used for a speech signal frame and a music signal frame.

10. The method according to claim 5, wherein, when the last correctly received frame prior to the current lost frame is the speech signal frame, it is judged whether the pitch period value of the current lost frame is usable using the manner according to claim 1.

11. The method according to claim 10, wherein when the last correctly received frame prior to the current lost frame is the music signal frame, judging whether the pitch period value of the current lost frame is usable in the following manner:

if the current lost frame is within a silence segment, considering that the pitch period value is unusable;

or if the current lost frame is not within the silence segment, when a maximum of normalized autocorrelation is larger than a nineteenth threshold $R_4$, wherein $0<R_4<1$, considering that the pitch period value is usable; and when the maximum of normalized autocorrelation is not larger than $R_4$, considering that the pitch period value is unusable.

12. The method according to claim 1, further comprising: after obtaining the compensated signal of the current lost frame, multiplying the compensated signal with a scaling factor.

13. The method according to claim 12, further comprising:

after obtaining the compensated signal of the current lost frame, determining whether to multiply the compensated signal of the current lost frame with the scaling factor according to a frame type of the current lost frame, and if it is determined to multiply with the scaling factor, performing an operation of multiplying the compensated signal with the scaling factor.

14. An apparatus for compensating for a lost frame in a transform domain, comprising processor for performing instructions stored in a non-transitory computer readable medium to execute steps in following units:

a frequency-domain coefficient calculation unit, a transform unit, and a waveform adjustment unit, wherein, the frequency-domain coefficient calculation unit is configured to calculate frequency-domain coefficients of a current lost frame using frequency-domain coefficients of one or more frames prior to the current lost frame;

the transform unit is configured to obtain an initially compensated signal of the current lost frame by performing frequency-time transform on the frequency-domain coefficients of the current lost frame calculated by the frequency-domain coefficient calculation unit; and the waveform adjustment unit is configured to obtain an estimated pitch period value by estimating a pitch period of the current lost frame to obtain a compensated signal of the current lost frame by judging whether the estimated pitch period value is usable, and if the pitch period value is unusable, use the initially compensated signal of the current lost frame as the compensated signal of the current lost frame; and if the pitch period value is usable, obtain the compensated signal of the current lost frame by performing waveform adjustment on the initially compensated signal with a time-domain signal of the frame prior to the current lost frame;

wherein, the waveform adjustment unit comprises a pitch period value judgment sub-unit, wherein, the pitch period value judgment sub-unit is configured to judge whether any of the following conditions is met, and if yes, consider that the pitch period value is unusable:

(1) a ratio of a lower-frequency energy to a whole-frame energy of the last correctly received frame prior to the current lost frame is less than a second threshold $ER_1$, wherein $ER_1>0$;

(2) a spectral tilt of the last correctly received frame prior to the current lost frame is less than a third threshold TILT, wherein 0<TILT<1; and (3) a cross-zero rate of a second half of the last correctly received frame prior to the current lost frame is larger than that of a first half of the last correctly received frame prior to the current lost frame by several times.

15. The apparatus according to claim 14, wherein, the waveform adjustment unit comprises a pitch period estimation sub-unit, wherein, the pitch period estimation sub-unit is configured to perform pitch search on a time-domain signal of a last correctly received frame prior to the current lost frame, to obtain a pitch period value and a maximum of normalized autocorrelation of the last correctly received frame prior to the current lost frame, and use the obtained pitch period value as a pitch period value of the current lost frame; or calculate a pitch period value of the last correctly received frame prior to the current lost frame, and use the obtained pitch period value as the pitch period value of the current lost frame and to compute a maximum of normalized autocorrelation of the current lost frame.

16. The apparatus according to claim 14, wherein, the pitch period value judgment sub-unit is further configured to judge whether the pitch period value is usable in accordance with the following criteria when it is judged that any of conditions (1)-(4) is not met:

(a) when the current lost frame is within a silence segment, considering that the pitch period value is unusable;

(b) when the current lost frame is not within the silence segment and the maximum of normalized autocorrelation is larger than a fourth threshold $R_2$, considering that the pitch period value is usable, wherein $0<R_2<1$;

(c) when criteria (a) and (b) are not met and a cross-zero rate of the last correctly received frame prior to the current lost frame is larger than a fifth threshold $Z_3$, considering that the pitch period value is unusable, wherein $Z_3>0$;

(d) when criteria (a), (b) and (c) are not met and a result of a current long-time logarithm energy minus a logarithm energy of the last correctly received frame prior to the current lost frame is larger than a sixth threshold $E_4$, considering that the pitch period value is unusable, wherein $E_4>0$;

(e) when criteria (a), (b), (c) and (d) are not met, a result of the logarithm energy of the last correctly received frame prior to the current lost frame minus the current long-time logarithm energy is larger than a seventh threshold $E_5$, and the maximum of normalized autocorrelation is larger than an eighth threshold $R_3$, considering that the pitch period value is usable, wherein $E_5>0$ and $0<R_3<1$; and (f) when criteria (a), (b), (c), (d) and (e) are not met, verifying a harmonic characteristic of the last correctly received frame prior to the current lost frame, and when a value representing the harmonic characteristic is less than a ninth threshold H, considering that the pitch period value is unusable; and when the value representing the harmonic characteristic is larger than or equal to the ninth threshold H, considering that the pitch period value is usable, wherein $H<1$.

* * * * *